United States Patent [19]

Taylor, Jr. et al.

[11] Patent Number: 4,486,830
[45] Date of Patent: Dec. 4, 1984

[54] PROGRAMMABLE CONTROL APPARATUS AND METHOD

[75] Inventors: Ralph C. Taylor, Jr.; Christopher L. Vaniglia, both of West Chester, Ohio

[73] Assignee: Cincinnati Milacron Inc., Cincinnati, Ohio

[21] Appl. No.: 363,510

[22] Filed: Mar. 30, 1982

[51] Int. Cl.³ .................................................. G05B 19/02
[52] U.S. Cl. ..................................... 364/146; 364/900; 364/141
[58] Field of Search .............................. 364/140–147, 364/200, 900

[56] References Cited

U.S. PATENT DOCUMENTS

| | | | |
|---|---|---|---|
| 3,942,158 | 3/1976 | Dummermuth et al. | 364/900 |
| 3,969,723 | 7/1976 | Kennicott | 364/200 |
| 3,997,879 | 12/1976 | Markley et al. | 364/141 |
| 4,038,533 | 7/1977 | Dummermuth et al. | 364/142 |
| 4,115,853 | 9/1978 | Dummermuth | 364/900 |
| 4,118,792 | 10/1978 | Struger et al. | 364/900 |
| 4,129,901 | 12/1978 | Masuda | 364/900 |
| 4,200,915 | 4/1980 | Struger et al. | 364/146 |
| 4,314,329 | 2/1982 | Crewe et al. | 364/141 |
| 4,326,263 | 4/1982 | Gwin et al. | 364/900 |
| 4,369,494 | 1/1983 | Bienvenu | 364/200 |
| 4,404,651 | 9/1983 | Grudowski | 364/140 |

OTHER PUBLICATIONS

Knath, D. E., "The Art of Computer Programming," Addison Wesley, vols. 1-3, 2nd ed., 1973, pp. 315-328, 451-468.

Primary Examiner—Charles E. Atkinson
Assistant Examiner—John R. Lastova
Attorney, Agent, or Firm—John W. Gregg

[57] ABSTRACT

An apparatus and method for controlling the operation of a system are provided. The overall system operation is described by a plurality of mechanism cycles of operation each defined by a sequence of instructions relating sensed conditions of input devices, selectable conditions of output devices and variable values. Instruction signals representing the instructions of the sequences are stored together with mechanism cycle status signals each representing the executability of the associated mechanism cycle. Only instructions associated with cycles for which the status signal represent an executable condition are executed. Instructions for cycles for which the status signals represent a nonexecutable condition are modifiable during execution of the other instruction sequence. The instruction signals include variable name signals associated with unique interface circuits connected to the input and output devices. The assignment of interface circuits to variable names is accomplished independently of the basic program generation and reassignment is accommodated during cycle execution irrespective of the condition represented by the status signal.

19 Claims, 52 Drawing Figures

FIG. 1

FIG.6a
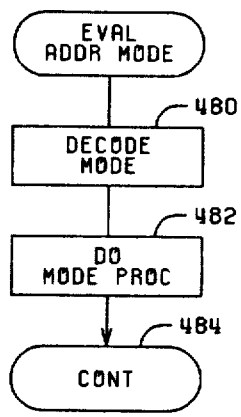
FIG.6b FIG.6c FIG.6d FIG.6e FIG.6f
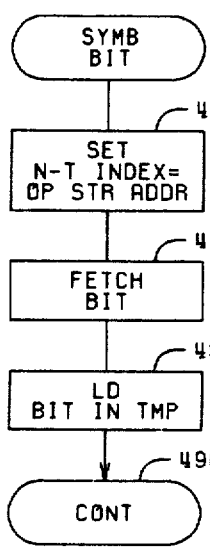 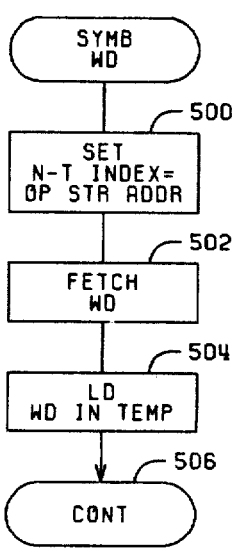 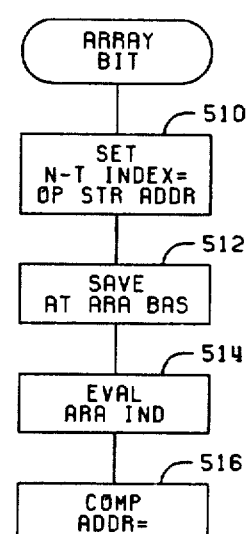 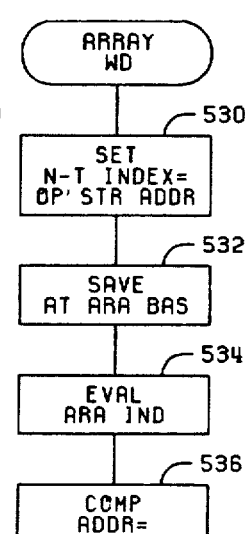 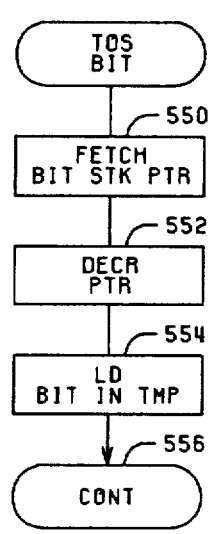
FIG.6g
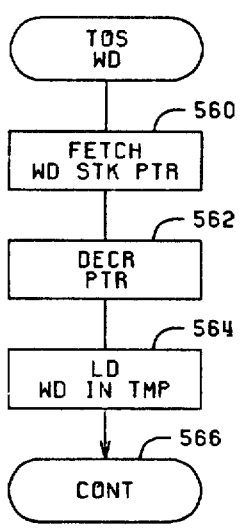
FIG.6h
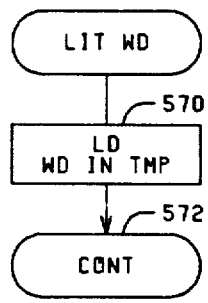

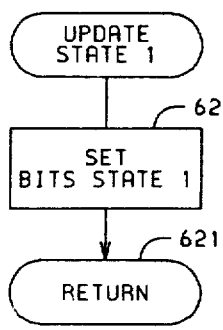
FIG. 8a
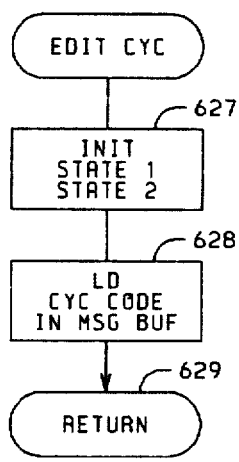
FIG. 8b
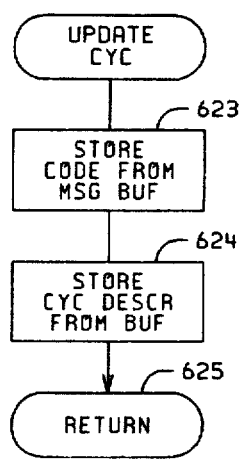
FIG. 8c
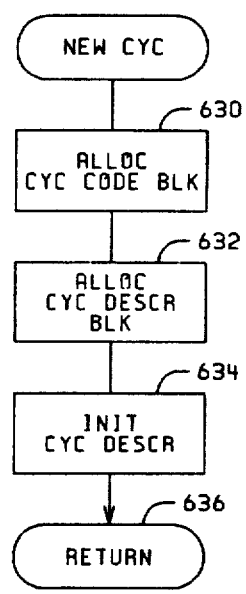
FIG. 8d
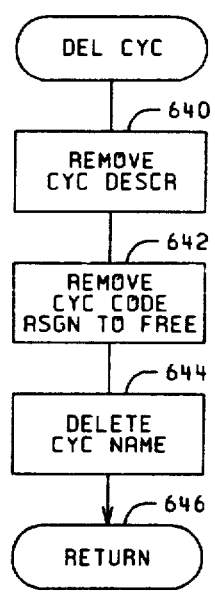
FIG. 8e
FIG. 9a
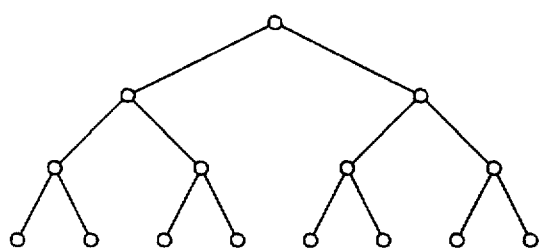

PROGRAMMABLE CONTROL APPARATUS AND METHOD

BACKGROUND OF THE INVENTION

This invention relates generally to mechanism control, particularly this invention relates to control systems of the stored program type known as programmable controllers.

Programmable controllers are known in which the stored program corresponds to a diagram relating switch contacts and relay or actuator coils. The diagrams are structured as rungs in a ladder where elements defining the rungs can be a combination of contacts connected in series and/or parallel ultimately terminating in a single coil. The controller processes the stored program by sequentially advancing through the elements of a rung accumulating the logical result of the current condition of the contacts and setting the coil to an energized or deenergized condition according to the accumulated logical result. Each rung is processed in turn and when all rungs have been processed, the cycle is repeated. The current contact status, i.e., whether the contact is opened or closed, may be determined at the moment a contact is being examined or before or after the ladder diagram processing has been completed. While this ladder diagram program structure has the advantage of familiarity for control designers it has an inherent disadvantage in that modifications to any part of the program require that all processing be inhibited, and consequently that the operation of the controlled mechanism temporarily be suspended. Furthermore, since the program contacts and coils are typically dedicated to particular interface circuits connected to controlled devices, substitutions of interface circuits for program elements requires that program element designations be changed to reflect the new interface circuit assignment. Thus, the entire program must be modified.

It is therefore an object of the present invention to provide a programmable controller having an instruction set readily adapted to program generation for the process of the controlled mechanism which permits program modifications while program execution continues.

It is a further object of the present invention to provide a programmable controller that executes a program including a plurality of instruction sequences representing mechanism cycles of operation and relating variable names corresponding to control devices and variable values.

It is a still further object of the present invention to provide a programmable controller that executes a program including a plurality of instruction sequences relating variable names and which permits modification of selected instruction sequences while execution of other instruction sequences continues.

It is a still further object of the present invention to provide a programmable controller which permits the assignment of interface circuits associated with mechanism devices to be performed independently of the generation of the program of the controlled process.

Further objects and advantages of the present invention shall become apparent from the following description.

SUMMARY OF THE INVENTION

In accordance with the aforesaid objects, a programmable control apparatus is provided having memory for storing instructions and data relating conditions of controlled devices and variables and having a processor for executing the instructions and for effecting modifications of a stored program and data. The stored program is arranged to include a plurality of instruction sequences, each sequence defining the process of a mechanism cycle of operation. Each instruction includes an operation to be performed and an operand identifying at least one data element which is the subject of the operation. The instruction operands include variable names which correspond to variable values and mechanism devices. Each mechanism cycle sequence has an associated cycle status signal for indicating the current executability of the instruction sequence. The processor periodically examines the cycle status signals and executes instructions of cycle sequences for which the status signal represents an executable condition of the cycle. Nonexecutable conditions include unexpired programmed delay intervals and expected but unsatisifed device conditions. The apparatus further includes a communication channel for exchanging messages between the controller and an external device. The processor responds to selected message types received through the communication channel to alter cycle status signals, instructions and data. The controller includes interface circuits for monitoring and controlling devices of the mechanism. The variable names which correspond to devices are independently assigned interface circuits so as to allow for reassignment of interface circuits without altering the stored cycle program. Variable names and associated data are stored in a name table memory having a binary tree data configuration.

BRIEF DESCRIPTION OF THE DRAWINGS

FIGS. 6a through 6h are flow charts of the operand processing routines.

FIGS. 8a through 8e are flow charts of instruction modification message routines.

FIG. 9a is a schematic representation of the name table binary tree.

DESCRIPTION OF THE PREFERRED EMBODIMENT

The preferred embodiment to be described corresponds to a programmable controller manufactured by Cincinnati Milacron Inc., the assignee of the present invention. While applicants have chosen to implement the invention using microprocessors commercially available, such as for example, the Intel Corp. 8086 or equivalents thereof, other devices may be used and it is not intended to thereby in any way limit the scope of the appended claims.

Figure 1:
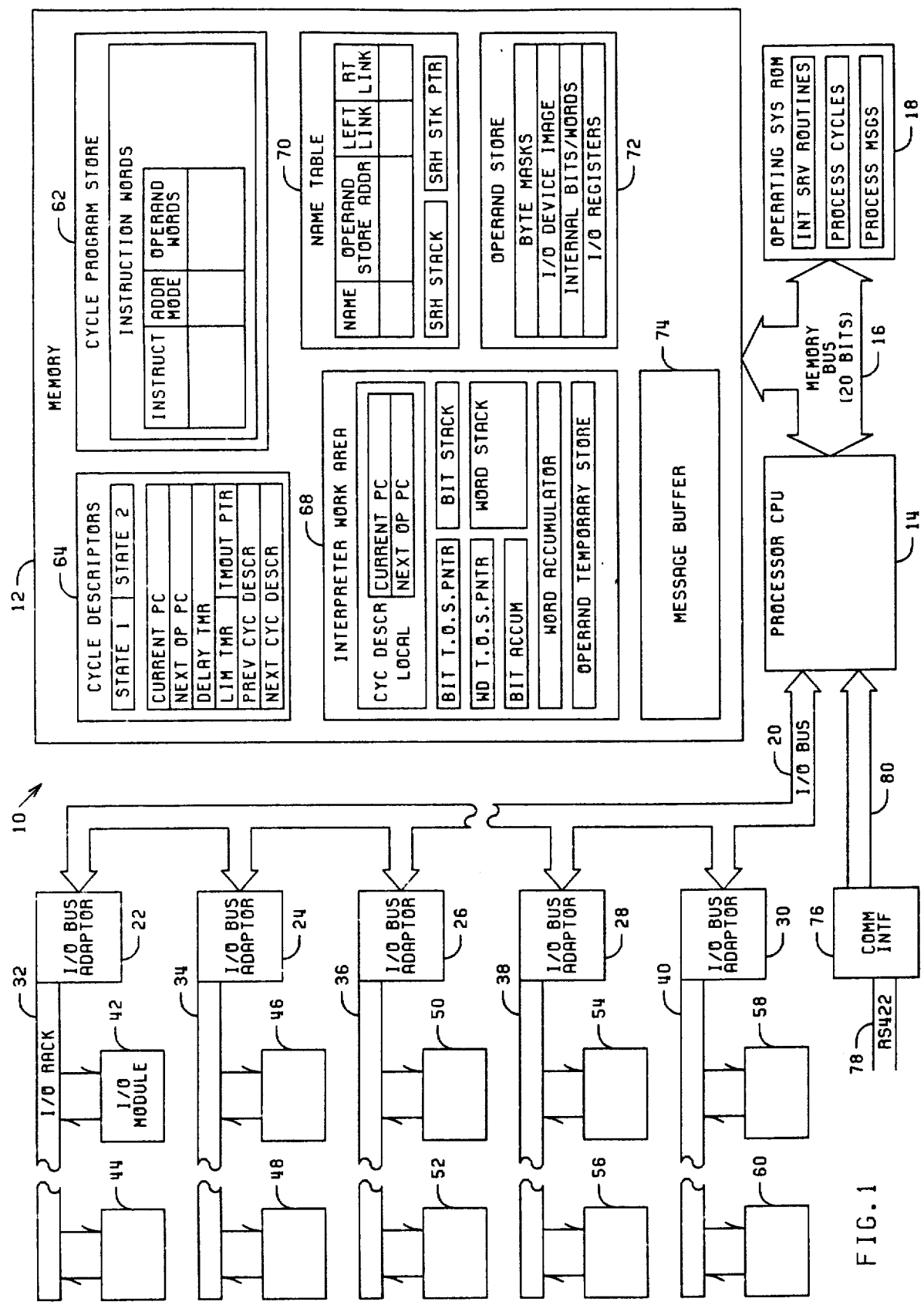
FIG. 1 is a block diagram of the programmable controller.

Referring to FIG. 1, the principal elements of the programmable controller 10 include the volatile memory 12, the processor 14, the operating system nonvolatile read only memory 18, the input/output interface bus 20 driving bus adapters 22 through 30, which in turn connect to the interface circuits or I/O modules 42 through 60 by means of interface racks 32 through 40, and the communications interface 76 connected to processor 14 through interface bus 80. The communication interface communicates to an external device through an EIA-RS 422 communications link 78. Processor 14 executes the instructions of the stored program residing in memory 12 by accessing data through memory bus 16 and in accordance with the operating system programs in the operating system ROM 18. The operating system programs include interrupt service routines, the cycle processing routines and the message processing routines.

The main system volatile memory is allocated in several major blocks including the cycle program store 62, the associated cycle descriptors store 64, the cycle processing interpreter work area 68, the name table 70, the operand store 72, and the message buffer 74. Applicants control scheme depends on defining the overall machine control function as a plurality of mechanism cycles of operation defining instruction sequences. When stored in memory, these cycles appear as the instruction words of program store 62 which include an instruction or operation code, an addressing mode and an operand. In addition to the cycle program store 62, cycle descriptor information associated with each cycle is stored in cycle descriptor store 64 which constitutes a cycle list. The cycle descriptor information includes; two cycle status words to indicate the current executability of a mechanism cycle and its associated sequence of instructions, a current program counter indicating the location of the instruction where execution of the cycle is to resume, a "next op" program counter indicating the location of the instruction to be executed following a delay instruction, a word for monitoring the time remaining for delay intervals of a cycle, a word for the time remaining of a cycle time limit interval, and a word for an associated timeout pointer, the location of the cycle descriptor of the immediately preceeding cycle, and the location of the cycle descriptor of the next cycle to be executed.

Within the interpreter area 68, the processor 14 relies on the immediate availability of information related to the instructions of the cycle currently being executed. Included within interpreter 68 are; a local duplicate of some of the cycle descriptor information including the current program counter and the "next op" program counter, a bit stack for saving bit values, a word stack for saving word values, the appropriate stack pointers for the bit stack and the word stack, a bit accumulator used in solving Boolean arithmetic functions, a word accumulator used in digital arithmetic operations and an operand temporary store for temporarily storing the value of an operand upon which an instruction or operation is to be executed.

Within the operand store 72, there are byte masks used for selectively accessing input bits and output bits of selected words stored in the device image store corresponding to particular input and output interface circuits within one of the interface modules 42 through 60. The I/O device image store is an area for storing the current values of input and output devices i.e., the condition sensing devices (input), such as limit switches, and the actuating devices (output), such as solenoids, of the controlled mechanism, as reflected by the interface signals seen at the I/O modules 42 through 60. The operand store 72 also includes storage for internal bits relating to variable names for bit values which do not correspond to input or output interface circuits and storage for input and output words used in conjunction with input and output devices operating on word data such as analogue interfaces. As the operand words stored in program store 62 may be merely an index into the name table 70, the value of a variable name is then retrieved through the operand store address located in name table 70 as applied to the operand store 72. The details of the evaluation of operands within program store 62 shall be discussed hereinafter.

Figure 2A:
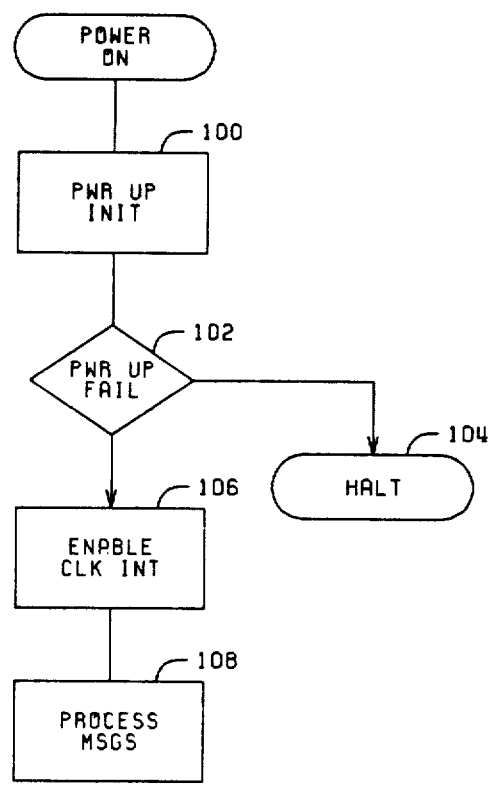
FIGS. 2a to 2f are flow charts of the primary processor controlled programs.

Referring now to FIG. 2a, the execution of the programmable controller operating system programs begins following power on with the execution of a power up initialize routine indicated by process step 100. The power up initialize routine is used to execute certain selfcheck programs to verify that the system hardware is functioning properly and to initialize the values of numerous system variables. Provided the power up initialization is executed to completion without an error, the decision step 102 will indicate that there is no power up failure and the system proceeds to enable the system clock interrupt as indicated by process step 106. The process then continues to the process step for processing messages 108. The communication message processing routine shall be described in detail subsequently. If there had in fact been a failure during the power up initialization the processor is given a halt as indicated by process terminal 104.

Figure 2B:
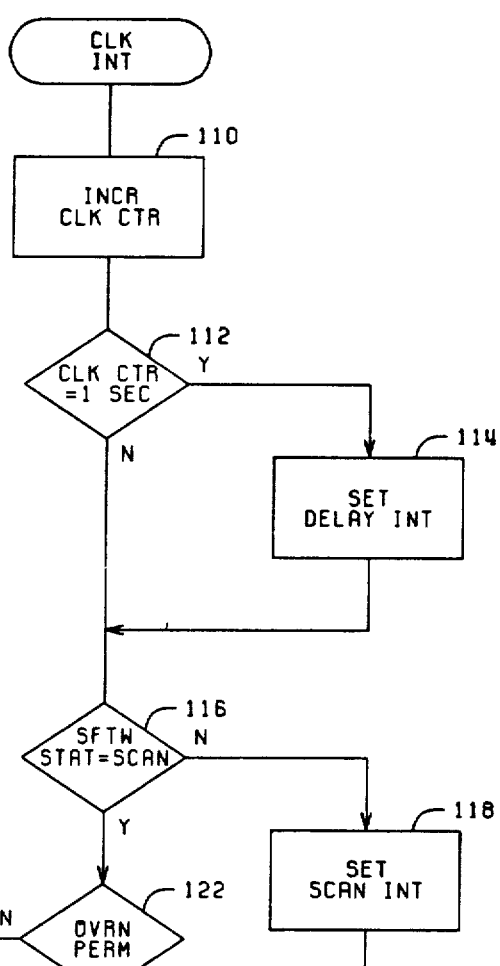

The clock interrupt service routine which responds to the system clock interrupt is shown in FIG. 2b. The system clock counter is incremented by process step 110 and the contents of the clock counter are tested to determine whether or not the system clock has measured an interval of one second as indicated by decision step 112. If a one second period has elapsed, then the interval delay interrupt is set to effect the execution of the delay interval interrupt service routine. This is indicated by process step 114. If, on the other hand, the clock counter has not measured the elapse of one second, then a decision is made immediately at step 116 as to whether or not the current software status is equal to scan. If the clock interrupt occurs during the execution of the scan interrupt service routine, the scan service routine has exceeded an acceptable period for execution and the decision step 116 leads to the decision step 122 to determine whether or not this time overrun is permitted. If an overrun is permitted, the clock interrupt service routine is complete and execution continues by return to the scan interrupt routine by the return of terminal 124.

If the overrun is not to be permitted, then the overrun flag is set as indicated by process step 126 and the current cycle is set to an error condition as indicated by process step 128. Thereafter, the process continues by return through the terminal 130. If the scan interrupt service had not been in progress upon occurrence of the clock interrupt the process would continue by setting the scan interrupt as indicated by process step 118 to enable processing of cycles and then return by terminal 120.

Figure 2C:
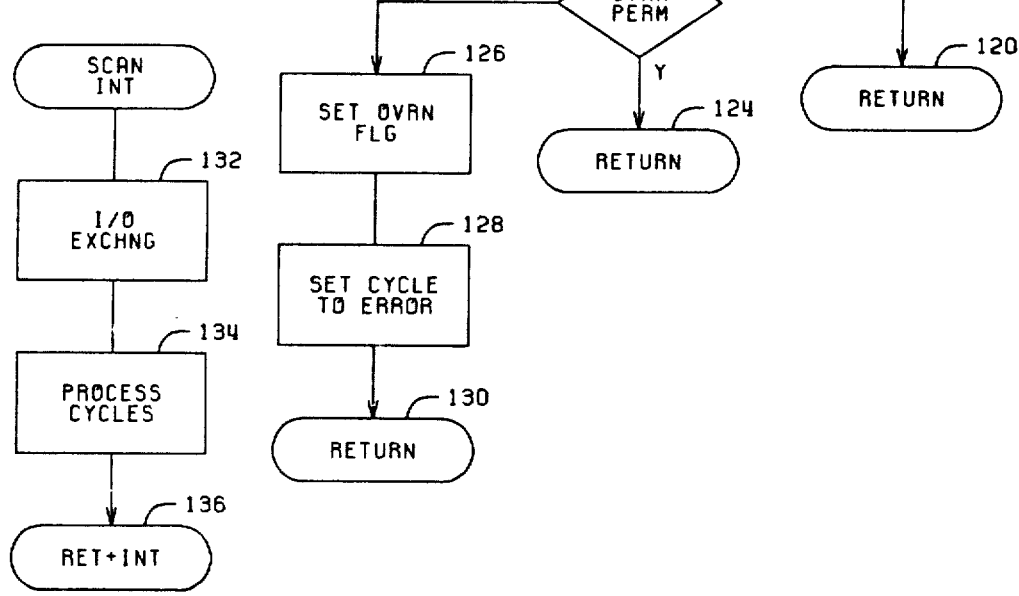

Referring now to FIG. 2c, the scan interrupt service routine is shown. Assuming that the scan interrupt has been set and provided that no higher priority interrupt need be serviced, the execution will proceed by first executing an input/output exchange routine indicated by process step 132 and then continuing to process cycles by the cycle processing routines as indicated by step 134. The scan interrupt service routine will conclude either by return to the message processing routine of FIG. 26 or by an interrupt as indicated by the terminal 136.

Figure 2D:
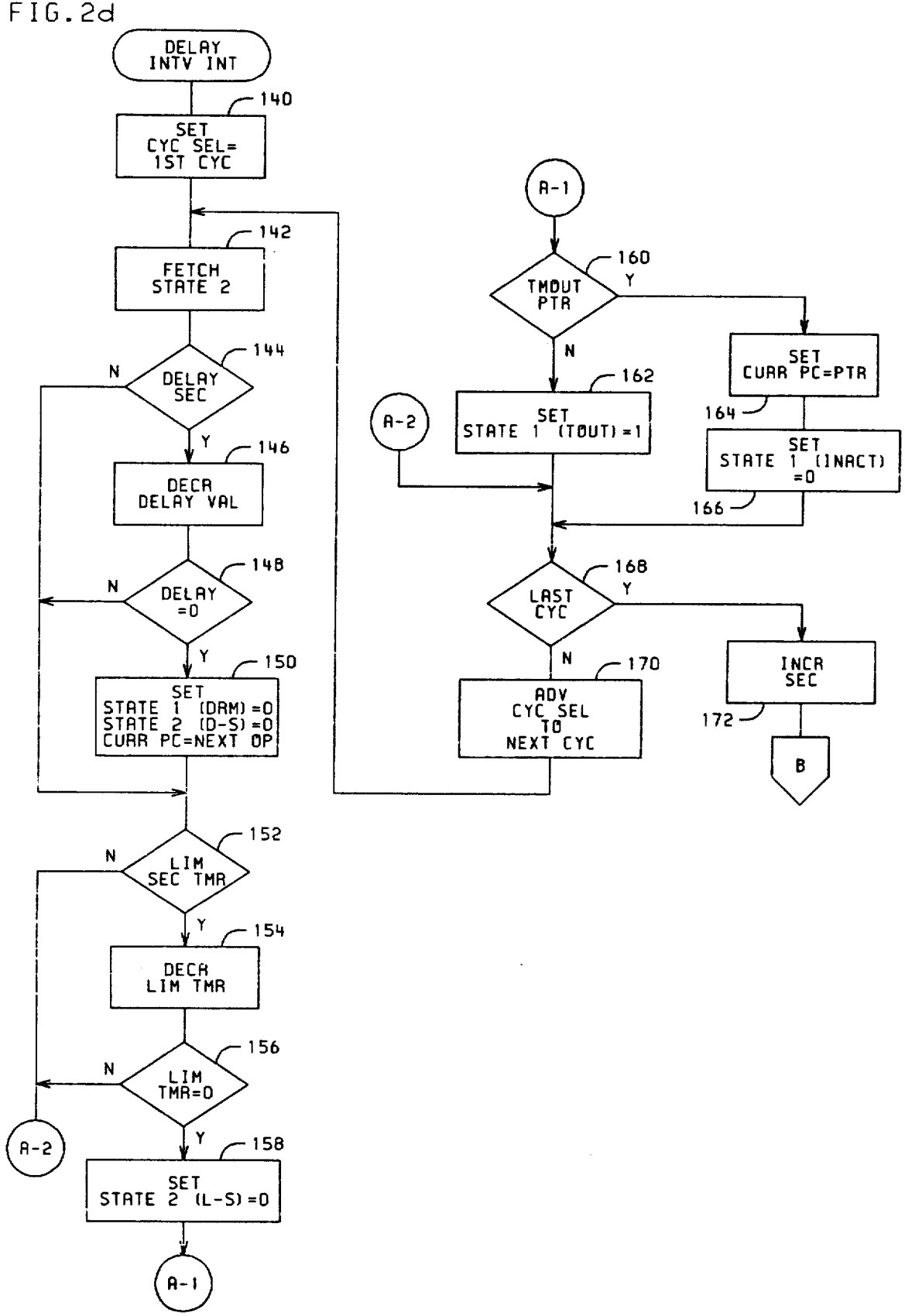
Figure 2E:
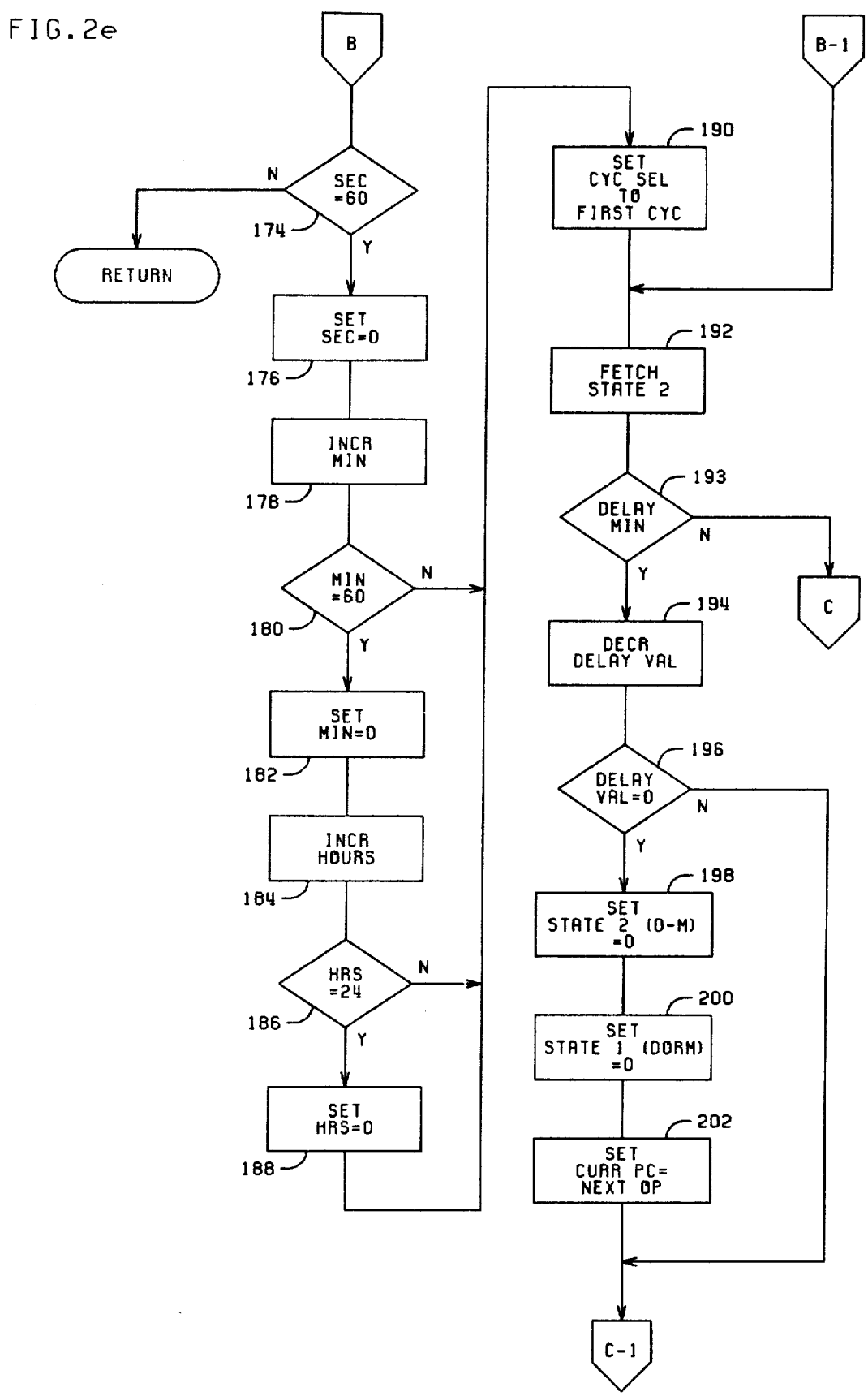
Figure 2F:
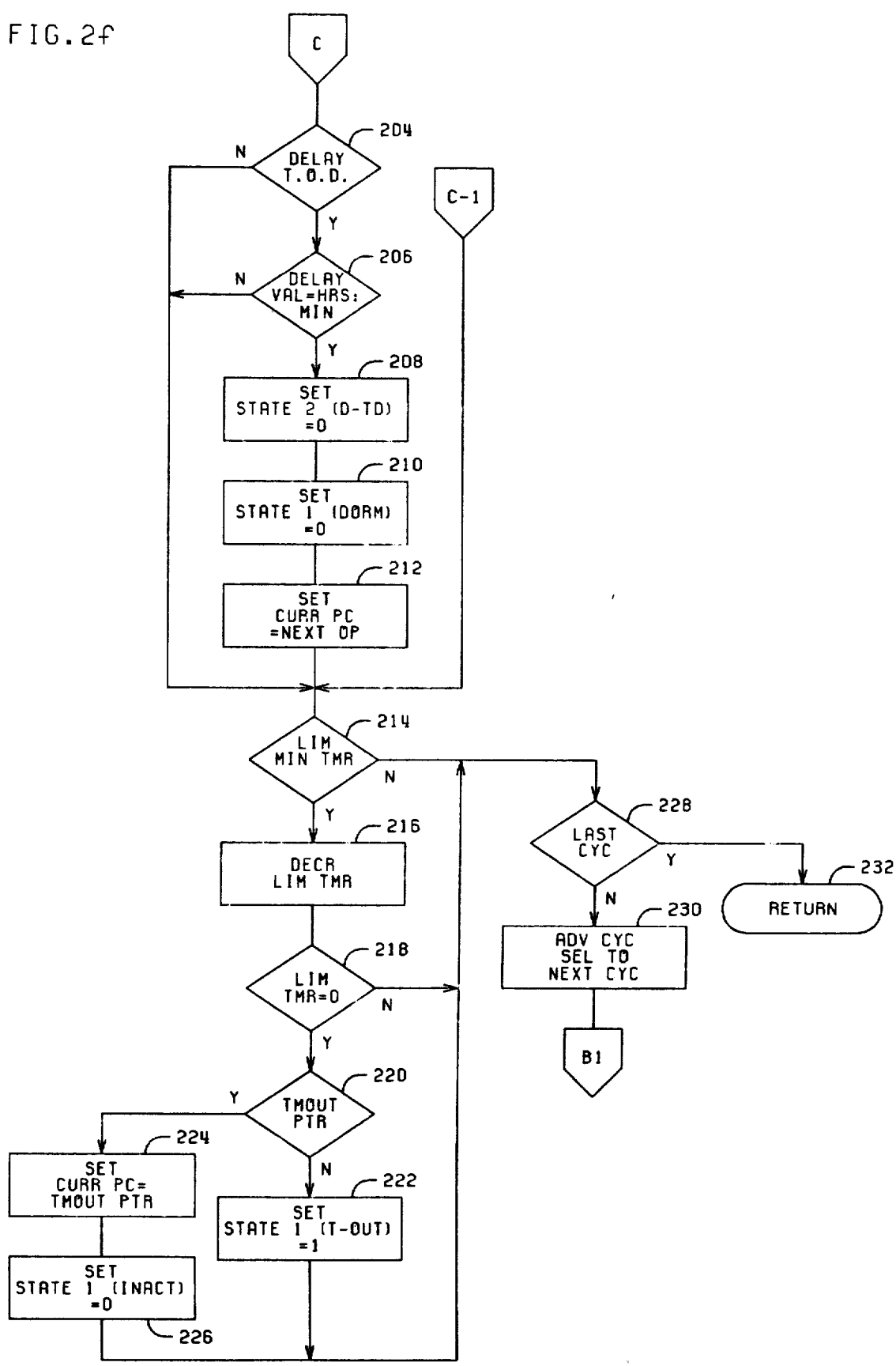

The last of the overall operating system routines or loops is shown in FIGS. 2d through 2f, representing the delay interval interrupt service routine. Applicants have chosen to permit program delay intervals measured in seconds or minutes or to delay to a programmed time of day. The delay interval interrupt service routine serves to update various interval counters, to determine which currently active cycles are in a delay interval, and to determine whether or not the program delay interval has expired. The delay interval interrupt service routine is executed when the delay interval interrupt has been set and it is currently the highest priority interrupt. The service routine begins at process step 140 by setting the cycle selector to the first cycle, that is, to select the cycle descripter of the first cycle of the cycle list. The second status word, used to record the type of delay and time limit in effect for the associated cycle, is retreived from the cycle descripter by process step 142 and is examined to determine whether the selected cycle is currently in a delay interval measured by seconds by decision step 144. If the selected cycle is delaying for seconds, the delay value is decremented by step 146 and the value is then tested to determine whether it is equal to zero by step 148. If it is equal to zero, then the first status word is set to a state to indicate that the selected cycle is not dormant and the second status word is set to a state to indicate that the cycle is not delaying for seconds, and the current program counter is forced equal to the next op program counter, all being indicated at process step 150. If, on the other hand, the selected cycle was not delaying for seconds, the steps 146 through 150 would be skipped and the process would continue at decision step 152. If the delay interval had not expired, then process step 150 would have been skipped and the process would continue at process step 152.

Process steps 152 through 166 of FIG. 2d are used to control the time permitted for the execution of any selected mechanism cycle of operation. If the mechanism cycle of operation is to be executed within a limited amount of time, a limit timer is set with the desired interval value according to the chosen interval resolution. Decision step 152 determines whether or not the second resolution timer limit value has been set as reflected by the second status word, and if so, the value is decremented at decision step 154 and tested for equality with zero at decision step 156. If the limit time has expired, the second status word of the cycle descriptor is set to indicate that the limit second timer has timed out by step 158 and decision step 160 determines whether or not a preselected point of program continuation has been recorded. If there is a time out pointer, decision step 164 sets the current program counter equal to the value of the time out pointer and process step 166 sets the first status word to the active state. If no time out pointer has been provided, then the first status word would be set to the time out state by process step 162. In the event the selected cycle does not have a second limit interval set or in the event the second limit interval has not expired, the process continues at decision step 168 to determine whether the selected cycle is the last cycle in the cycle list and if not, the cycle selector is set to the next cycle by process step 170. On the other hand if the selected cycle was the last cycle of the cycle list, the process continues at process step 172 by incrementing a second counter and continues therefrom through the offpage connector B to FIG. 2e.

Referring now to FIG. 2e, process steps 174 through 188 are used to update a minute counter and an hours counter which are used when a delay to time of day has been stored for the selected cycle. At decision step 174, the second counter is tested for equality with 60 and if not equal to 60, the delay interval interrupt routine is complete and the process execution continues within the process that had been interrupted by the delay interval interrupt. If the second counter is equal to 60, the second counter is set to zero and the minute counter is incremented as shown in process steps 176 and 178. The minute counter is then tested for equivalence with 60 by decision step 180, and if equal to 60, set equal to zero by step 182 and the hours counter is incremented by step 184. The hours counter is tested for equality with 24 at decision step 186 and if equal to 24, it is set equal to zero by process step 188. If the minute counter had not been equal to 60, or if the hours counter had not been equal to 24, or if both conditions were met then the process continues at process step 190 where the cycle selector is set to the first cycle in the cycle list.

As in the case with the routine for processing second delays the cycle status of the selected cycle is tested to determine whether or not the selected cycle is delaying for an interval measured in minutes by decision step 193. A minute delay interval is treated in the same manner as a second delay interval and in this case, the process steps 194 through 202 of FIG. 2e are used to adjust the minute delay interval counter, test it and take the appropriate processing path.

In the event the selected cycle is not set to delay for an interval measured in minutes, the process continues in FIG. 2f at decision step 204 to determine whether the selected cycle is delaying to a programmed time of day. Process steps 206 through 212 of FIG. 2f test the actual measured time of day against the programmed delay time and adjust the status words of the selected cycle to the appropriate conditions. Following the time of day processing, the selected interval is tested to determine whether it is programmed with a minute interval limit and if not, the process continues at decision step 228 to determine whether or not the selected cycle is the last cycle of the cycle list. If not, the cycle selector is advanced to the next cycle of the cycle list and the process continues through off page connector B1 at process step 192 of FIG. 2e. If the selected cycle is the last cycle of the cycle list, the process of the delay interval interrupt routine is complete and processing resumes through the return of terminal 232 to the interrupted process. If the selected cycle were subject to a minute resolution interval limit steps 214 through 226 of FIG. 2f process the interval minute limit in the same fashion as the interval second limit previously described.

It will now be appreciated that the three primary loops of FIGS. 2a through 2f supervise the overall execution of mechanism cycle instructions within the programmable controller in accordance with the assigned priority levels of the interrupt service routines for the clock interrupt, scan interrupt and delay interval interrupt. The scan interrupt service routine of FIG. 2c is the primary loop for execution of the mechanism cycle of operation and comprises the two principal routines designated as the I/O exchange and the cycle processing routine. The clock interrupt routine of FIG. 2b and the delay interval interrupt routine of FIGS. 2e and 2f are used to manage the overall processing time of the controller processor 14.

Figure 3:
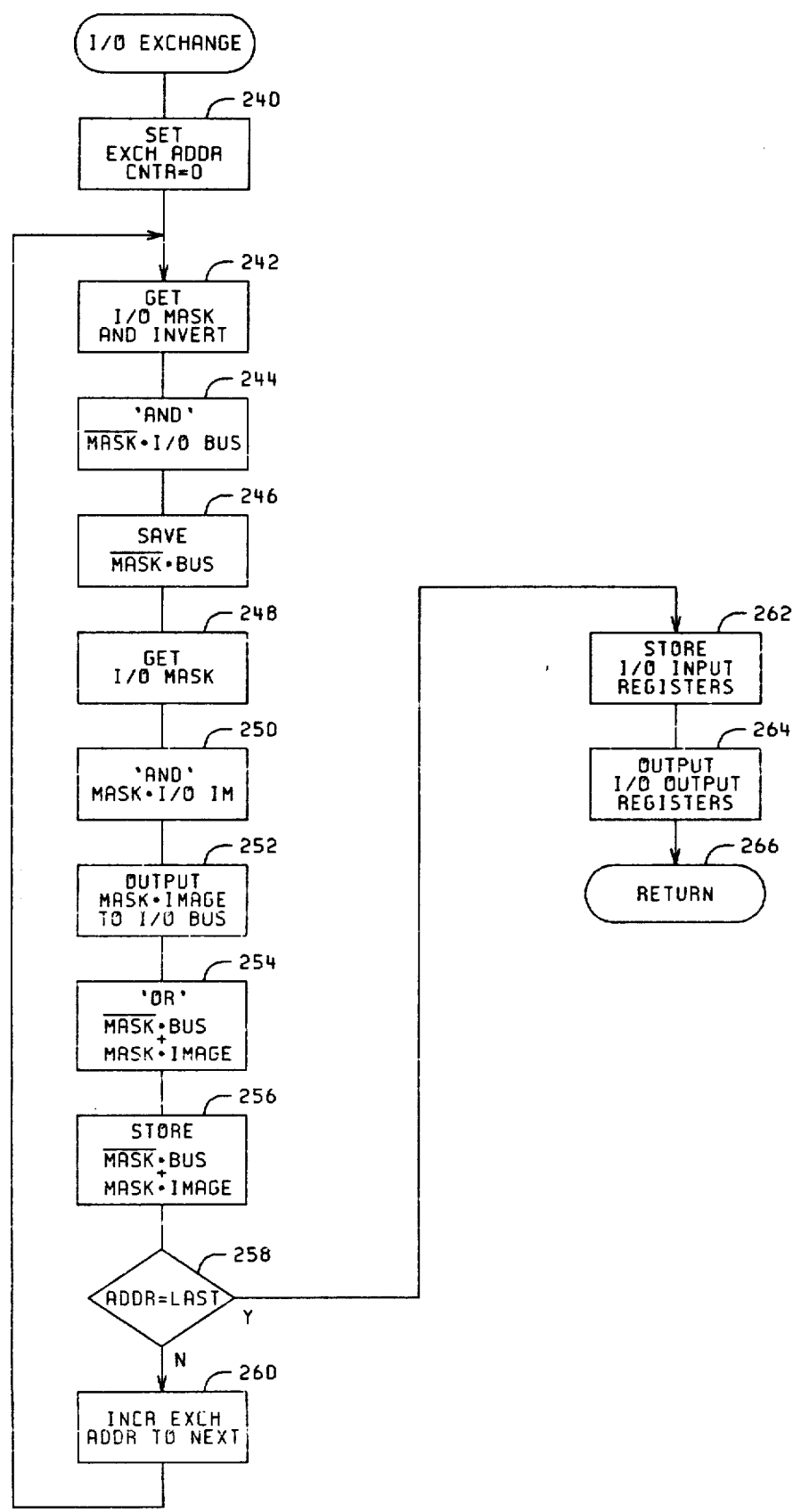
FIG. 3 is a flow chart of the interface circuit update routine.

Referring now to FIG. 3, the I/O exchange routine used to update the IO device image and the operand store 72, and to update the current state of interface circuits for the output interfaces in the I/O modules 42 through 60 is shown. The I/O device image storage reflects the current state of both the input and output device interface circuits of the I/O modules 42 through 60. As the cycle instructions are processed by processor 14, new values for I/O interface circuits associated with output devices are developed in accordance with the then current condition of the interface circuits associated with input devices of the controlled mechanism. The I/O exchange routine is, then, a procedure for maintaining the current status of input devices within the I/O image table and for transferring the newly created states to interface circuits associated with output devices. The actual data transfers to and from the interface circuits of modules 42 through 60 of FIG. 1 are accomplished through I/O bus 20 and the bus adaptors 22 through 30. Each bus adaptor encodes the interface circuit condition from the I/O modules and places data words on the I/O bus 20 identifying the rack, module, and circuit and representing the circuit state. Likewise, each bus adaptor decodes data words identifying the rack, module and circuit placed on the I/O bus 20 by processor 14 in order to update the state of a selected circuit.

Referring now to FIG. 3, the I/O exchange routine begins with process step 240 where the exchange address counter is set equal to the first address of the device image. The appropriate input/output mask from operand store 72 is selected and inverted at process step 242. The inverted mask is "ANDED" with the I/O bus at process step 244 to isolate the bits representing states of the interface circuits associated with input devices. The result is then saved at process step 246. At process step 248 the I/O mask is once again retrieved and at process step 250 the mask is "ANDED" with the selected byte of the I/O image to isolate the bits associated with interface circuits driving the output devices. The state of these bits is then transferred to the I/O bus at process step 252. At process step 254 the saved input bits are "ORED" with the newly transferred output bits and the combination is then restored to the I/O device image table by process step 256. The address counter is then tested to determine whether the selected address is the last address of the table and if not, the address counter is incremented at process step 260. If, on the other hand, the address counter was equal to the last address of the image table as determined by decision step 258, the process continues at process step 262 to store word values in the I/O input registers from the I/O bus and then therefrom on to the process step 264 to output word values to the I/O bus from the I/O output registers. These last two steps accommodate I/O interfaces which operate on word information, such as analogue to digital and digital to analogue converters. This completes the IO exchange processing and overall system processing continues through the terminal 266 to the scan interrupt service routine.

Figure 4:
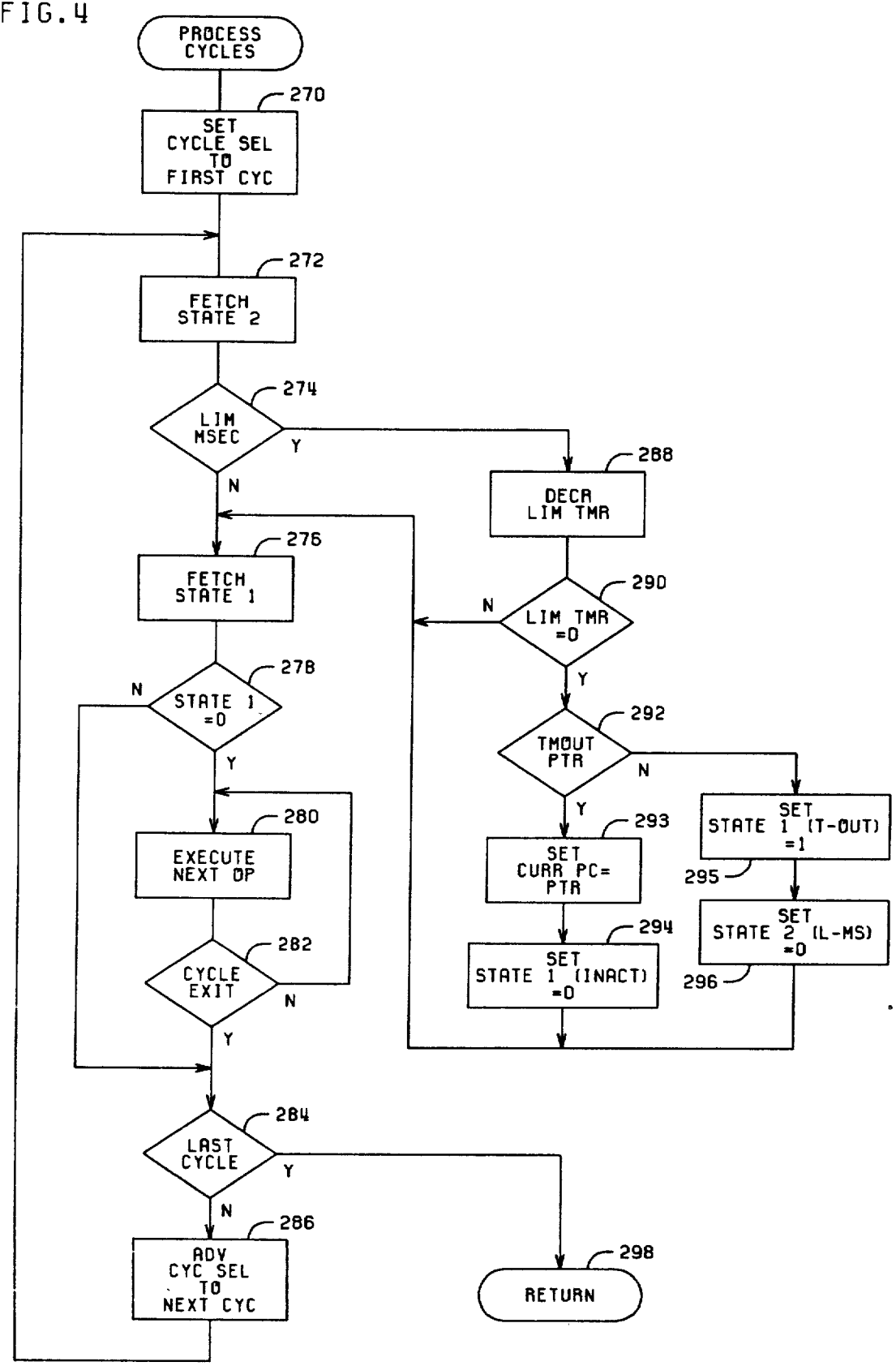
FIG. 4 is a flow chart of the overall cycle processing routine.

Referring now to FIG. 4, the cycle processing routine executed under control of the scan interrupt service routine is shown. As previously stated, an insruction sequence associated with a mechanism cycle of operation is identified by a cycle name and associated with two cycle status words. The first status word reflects the executability of the cycle, while the second word reflects the dimension of delay intervals and time limits. Only those cycles for which the first status words are currently in a condition reflecting the executability of the selected cycle will be processed by the cycle processing routine. Cycle processing begins at process step 270 of FIG. 4 with the selection of the first cycle of the cycle list. The second status word of the selected cycle is retrieved as indicated by process step 272 and tested to determine whether or not the selected cycle is subject to a timed interval limit measured by milliseconds as shown by decision step 274. If so, the process continues through steps 288 through 296 in the same fashion as was used to process the interval limits described with relation to the delay interval interrupt service routine. If no millisecond interval limit has been set, or if the set millisecond limit interval has not expired, the process continues at process step 276 which retrieves the first status word for the selected cycle. This status word is tested to determine the executability of the selected cycle as shown at decision step 278.

Provided the selected cycle is an executable cycle, execution of the instruction sequence proceeds by execution of the instruction identified by the current program counter. If upon completion of execution of that operation, the cycle exit flag has not been set, as determined by decision step 282, then execution of additional instructions of the instruction sequence is accomplished by the return line from decision step 282 continuing the process at step 280. If, on the other hand, the cycle exit flag of the selected cycle has been set by execution of an instruction, the overall cycle processing routine continues at decision step 284 where it is determined whether or not the selected cycle is the last cycle of the cycle list. If so, the cycle processing routine is complete and processing returns to the scan interrupt routine as indicated by the terminal 298. If the selected cycle is not the last cycle in the cycle list, then the cycle selector is advanced to the next cycle of the list by process step 286 and the cycle processing routine is repeated. In this manner, the current status of all of the cycles of the cycle list are interrogated and instructions of the executable cycles are executed until the condition of the cycle to be executed is set to a nonexecutable condition or until the cycle exit flag is set. The actual execution of the instructions of an executable cycle is carried out in accordance with the instruction execution routines of FIGS. 5a through 5r.

Figure 5A:
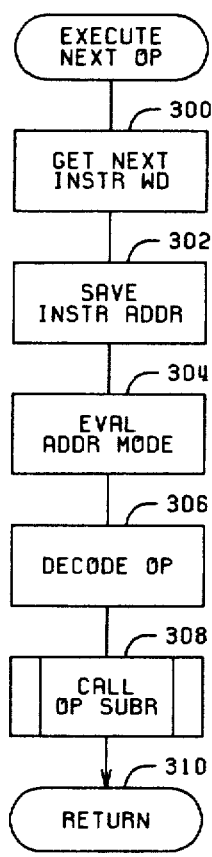
FIGS. 5a to 5r are flow charts of the instruction operation routines.

Referring now to FIG. 5a, the process step 280 of FIG. 4 is expanded in FIG. 5a to show the steps necessary to execute the instructions of the instruction sequence. Beginning at process step 300 of FIG. 5a, the next instruction word is retrieved from the cycle program store 62, the instruction address is saved at process step 302, the addressing mode of the retrieved instruction word is evaluated as indicated by process step 304, the operation code is decoded at step 306 and the decoded operation subroutine is then called by process step 308. Each of the instructions to be executed by processor 14 in cooperation with the interpreter 68 are defined by unique subroutines. Upon completion of execution of the operation subroutine the instruction processing is complete and processing is returned to the cycle processing routine of FIG. 4 by the return terminal 310 of FIG. 5a.

Figure 5B:
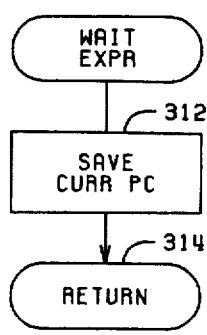
Figure 5C:
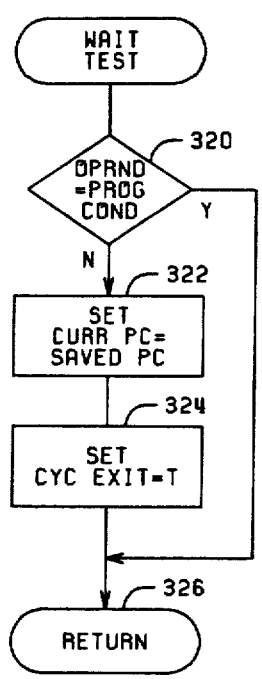
Figure 5D:
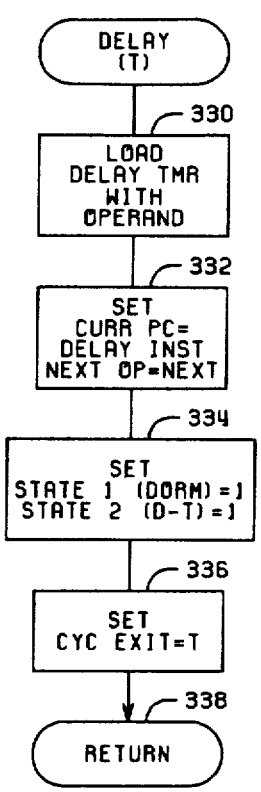
Figure 5E:
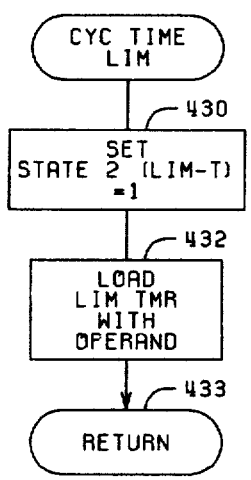
Figure 5F:
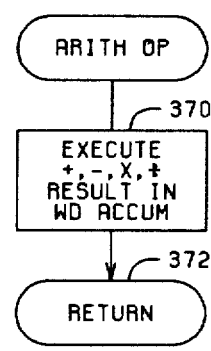
Figure 5H:
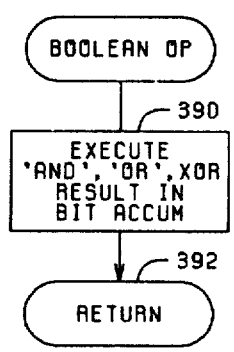
Figure 5G:
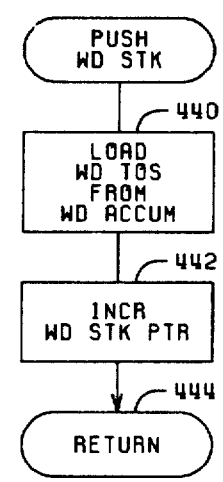
Figure 5I:
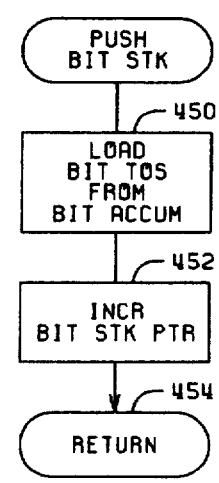
Figure 5J:
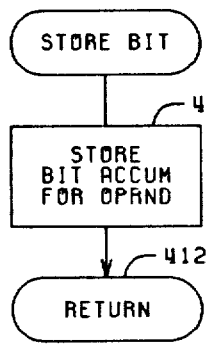
Figure 5K:
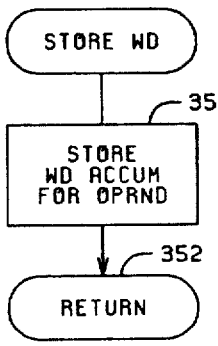
Figure 5M:
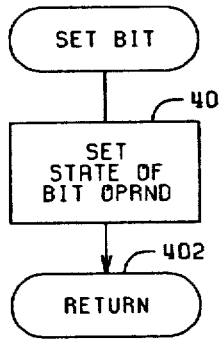
Figure 5N:
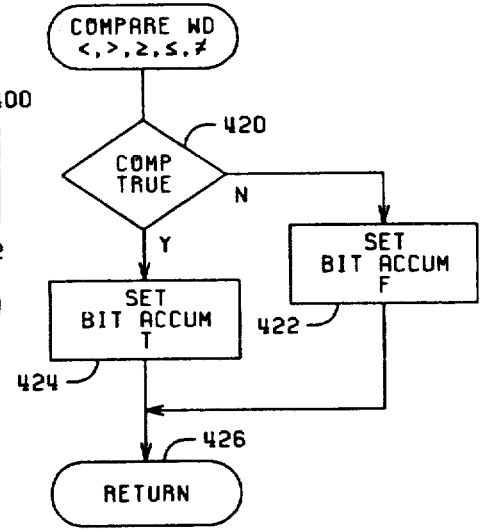
Figure 5P:
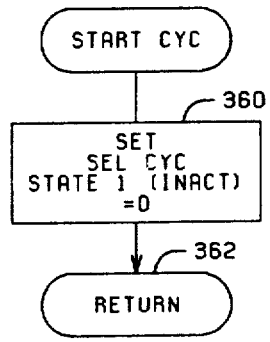
Figure 5Q:
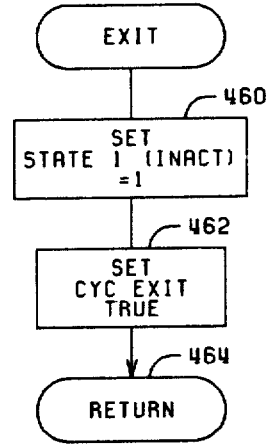
Figure 5R:
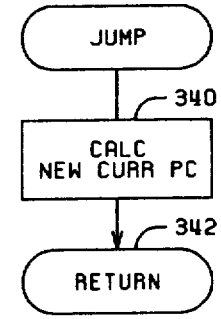

It is to be appreciated by those skilled in the art that the complete instruction set of the controller is not limited to the examples described and shown in FIGS. 5b through 5r, rather, these are illustrative only of instructions which serve to accomplish the overall mechanism cycle processing embodied by the present invention. It is the intention of applicants that the mechanism cycle of operation incorporate at least one conditional instruction, i.e. an instruction that depends either upon the expiration of a programmed interval or upon the satisfaction of a predicted condition. Thus, during the processing of cycles, it is anticipated that there will be periods when the execution of a particular cycle is temporarily inhibited due to the fact that the predicted condition is not met or that the programmed interval has not expired. The principal conditional instructions are illustrated in FIGS. 5b, 5c and 5d.

Referring to FIG. 5b, a wait expression instruction causes the current program counter (PC) of the selected cycle to be saved prior to execution of a series of instructions intended to evaluate an expression. Referring to FIG. 5c, the complementary wait test instruction determines whether the resultant of the expression evaluation is equal to the programmed condition at decision step 320, if so, the processing continues with execution of the following instructions as indicated by the yes side of decision block 320 proceeding to the terminal 326. If, on the other hand, the resultant is not equal to the programmed condition, then the current program counter is set equal to the saved value corresponding to the value of the program counter saved by step 312 of FIG. 5b thereafter, at process step 324 the cycle exit flag is set to the true condition. Processing continues by returning to the execution of the cycle processing routine through terminals 326 and 310.

Referring now to FIG. 5d, the delay instruction routine for initiating delay intervals is shown. The processing of delay intervals has already been described with respect to the delay interval interrupt service routine of FIGS. 2d-2f. Process step 330 of FIG. 5d loads the programmed delay value which is the operand of the delay instruction, into the delay time storage location of the selected cycle. Process step 332 forces the current program counter of the selected cycle equal to the delay instruction address and the next op PC equal to the next instruction address. Process step 334 sets the first status word equal to the dormant state and the second status word to the selected delay state depending on the dimension, i.e., minutes, seconds or time of day. Process step 336 sets the cycle exit flag to the true condition completing the delay instruction subroutine from which the cycle processing is continued through the return of terminal 338.

FIG. 5e shows the instruction subroutine for setting the cycle interval limit timer, the processing of which has been discussed with respect to the delay interval interrupt service routine. Process step 430 of FIG. 5e sets the second status word to the selected limit interval dimension and process step 432 stores the operand of the instruction, having the limit value in the limit timer. Terminal 433 effects a return to cycle processing of FIG. 4.

FIGS. 5f through 5i are the primary routines necessary to execute digital arithmetic and Boolean arithmetic or logic. In particular, the subroutine of FIG. 5f represents the set of digital arithmetic operations and the subroutine of FIG. 5g shows use of the word stack to facilitate chaining arithmetic operations. Referring to FIG. 5f, an arithmetic operation subroutine executes the designated arithmetic operation leaving the result in the word accumulator of interpreter 68 and returns to the cycle processing of FIG. 4. In the event that a series of arithmetic operations are to be performed, the use of the word stack of interpreter 68 allows intermediate results to be loaded into the stack and retrieved therefrom by manipulation of a stack pointer. Entries are made to the stack by an instruction and retrieved by evaluation of an addressing mode. Thus, the processing step 440 loads the word stack from the word accumulator and process step 442 updates the word stack pointer. Upon completion of the stack operation, cycle processing continues by return to terminal 442 to the flow chart of FIG. 4.

In a similar fashion, Boolean arithmetic operations may be performed as represented by the subroutine flow chart of FIG. 5h. There the selected Boolean arithmetic operation is executed by process step 390 leaving the logical result in the bit accumulator of interpreter 68, and processing continues by the return of terminal 392. In order to chain a series of Boolean arithmetic operations, the intermediate results may be placed in the bit stack and the subroutine for placing entries in bit stack is illustrated in FIG. 5i where process step 450 loads the top of stack from the accumulator and process step 452 updates the bit stack pointer. As the case with the word stack, values are retrieved from the bit stack by evaluation of an addressing mode. Upon completion of the bit stack operation, cycle processing continues through the return of terminal 454 to the flow chart of FIG. 4.

It will be appreciated that while the implementation of counting functions may be accomodated by use of the digital arithmetic operations, the traditional programmable controller functions of solving for a logical result in response to the conditions of selected inputs is best accomplished using the Boolean arithmetic operations. The result of the Boolean arithmetic operations is left in the bit accumulator storage area within interpreter 68. In order to effect transfer from the bit accumulator to the operand store 72 the store bit instruction is utilized. Shown in FIG. 5j, the subroutine effects a transfer of the value from the bit accumulator to the operand store by process step 410 and thereafter returns to the cycle processing routine of FIG. 4. A further instruction (not illustrated) permits loading the bit accumulator with an operand value. To round out the bit processing capabilities of the instruction set, the set bit instruction of FIG. 5m enables the state of a bit operand to be set directly "on" or "off" as indicated by process step 400 and thereafter the cycle processing continues through the return of terminal 402.

The store word instruction subroutine of FIG. 5k corresponds to the store bit instruction and effects a transfer of the value from the word accumulator to the operand store by process step 350 and thereafter returns to the cycle processing routine of FIG. 4 through terminal 352. An instruction to load the word accumulator with an operand value is accommodated but not shown. To complete the instruction set for word processing, the compare instruction of the flow chart of FIG. 5n permits the comparison of two values for equality and all levels of inequality through appropriate instructions for comparing word values to the operand value. If the word comparison results in a true condition, as determined by decision step 420, then the bit accumulator is set true by process step 424 and if the compare condition is not met then the bit accumulator is set false by process step 422. In either event, following the setting of the bit accumulator, the cycle processing continues by return through terminal 426.

Two additional instructions are used to directly control the overall cycle processing, these include the start cycle instruction of FIG. 5p which by process step 360 sets the state of the first status word of the selected cycle to its active condition and thereafter returns to cycle processing through terminal 362. In addition to the ability to initiate the processing of a selected cycle, the processing of a selected cycle may be exited upon command by execution of an exit instruction the subroutine for which is illustrated in FIG. 5q. At process step 460 of FIG. 5q the first status word of the selected cycle is set to an inactive condition and the cycle exit flag is set to a true condition by process step 462 and thereafter the cycle processing continues by return to terminal 464.

An additional control of cycle processing within a cycle is effected by the jump instruction illustrated in FIG. 5r which enables the program to effect branching within the instruction sequence as desired. Process step 340 of FIG. 5r effects the calculation of a new value for the current PC which is then stored and the cycle process continues by the return through terminal 342.

Referring once again to FIG. 5a, the overall instruction execution routine requires the evaluation of the operand addressing mode as indicated by process step 304. FIG. 6a shows the address evaluation routine. Beginning at process step 480, the addressing mode is decoded and thereafter the mode procedure is executed as shown by the process step 482. Upon completion of the addressing mode evaluation, the processing of the instruction is continued as indicated by the terminal 484 of FIG. 6a which would return to the routine of FIG. 5a at process step 306. As has previously been stated, the operands may include variable names corresponding to controlled devices as well as variable values. Additional operand types include; the actual operand value designated literal, and stack values from the word stack and the bit stack. To further enhance the overall addressing capability applicants, have chosen to include array addressing which permits the designation of a series of values by a single array name and the selection of a particular value of the series by means of an array index. To accommodate the broadest spectrum of array addressing, the array name is always stored as a variable name while the array index may be stored as a literal, a variable name, or as a stack value.

FIGS. 6b and 6c illustrate the address evaluation subroutines for variable names for both bit and word variables. The operand stored when the addressing mode is the symbolic or variable name bit or word type is the identifier or locater, that is, the index, of the variable within name table 70. Referring to FIG. 6b, the name table index is set to the operand value plus the increment to the operand store address. This address points to a location within the device image or internal bit table and the bit value is then retrieved by process step 492. The selected bit from the operand store 72 is then loaded in the operand temporary store of interpretor 68 by process step 494 and thereafter the instruction execution routine is permitted to continue through terminal 496. In a totally analgous fashion, the routine of FIG. 6c processes a symbolic or variable name word addressing mode, beginning at process step 500 by setting the name table index to the operand store address based upon the operand value stored with the instruction word. Thereafter process step 502 retrieves the word through the operand store address and the desired word value is loaded in the temporary store by process step 504. Execution continues to the instruction processing routine by terminal 506.

FIGS. 6d and 6e show the overall address evaluation routines for arrays of the bit and word variety. Referring to FIG. 6d, the name table address index is set to the operand value plus the increment for the operand store address. The base address within the operand store for the selected array is saved at the array base by process step 512. Thereafter an evaluation of the array index address is made and the array index is returned through the process step 514. At process step 516, the operand store address comprising the sum of the array base and index is computed and the selected bit value is stored in the temporary store by process step 518. Thereafter, the instruction word processing continues to terminal 520. Referring to FIG. 6e, the array word routine executes the same general procedure via steps 530 through 538 loading the operand word value in the temporary store by process step 538 and thereafter the instruction word processing continues through terminal 540.

FIGS. 6f and 6g show the procedures for evaluating the addressing mode for retrieving variable values from the bit and word stack. Referring to FIG. 6f, the addressing mode TOS BIT indicates the top of the bit stack. The bit stack pointer value is retrieved by process step 550, the pointer, which normally indicates the next empty location of the bit stack, is decremented at process step 552 to locate the last entry of the bit stack and process step 554 places the bit value from the top of the stack in the temporary store of interpreter 68. Thereafter, the instruction processing continues by the terminal 556. Referring to FIG. 6g, where the addressing mode TOS WO indicates that a value from the top of the word stack is desired, the process step 550 retrieves the word stack pointer value from interpreter 68, the word stack pointer is decremented to point to the last entry on the word stack by process step 562 and the indicated word value is then loaded in the operand temporary store of interpretor 68 by process step 564. The top of stack addressing evaluation having been completed instruction word processing continues through terminal 566.

In addition to the varable name type addressing modes, the literal addressing modes provide for the storage of the operand value directly with the instruction word and FIG. 6h is the routine for processing the literal word addressing mode. Referring to FIG. 6h, if the addressing mode is a word literal mode, process step 570 places the operand value in the interpreter temporary store and the instruction processing continues through terminal 572.

It will now be appreciated by those skilled in the art, that applicants' control scheme permits program generation using a relatively simple instruction set and facilitates processing of Boolean arithmetic and digital arithmetic operations within the mechanism cycles of operation. The program generation requires that the overall process to be controlled be examined and broken down into a number of fairly simple cycles of operation. Each cycle is then assigned a name and a series or sequence of instructions which relate the devices associated with the mechanism cycle is described using the elementary instructions of the controller instruction set and variable names chosen by the programmer. Within each cycle there should be at least one conditional instruction that depends upon the expiration of a programmed interval or upon the satisfaction of a condition which is subject to change. The control scheme thus far described permits execution of the instructions of these instruction sequences in the most efficient manner for the management of the processor time. Specifically, unconditional instructions of an executable sequence are rapidly executed in sequence. Cycle processing is exited upon reaching an unsatisfied conditional instruction making the subsequent instructions of the sequence unexecutable. The instructions of each executable cycle are processed in this manner until all executable cycles have been processed. Thereafter, the processor proceeds to message processing.

When it becomes necessary to modify the instructions of a sequence, it is possible using the message processing routines to be described hereinafter, to modify instructions associated with a particular cycle while the processing of other cycles continues without interruption. This is a consequence of programming the overall controlled process in cycles each having a status word reflecting the executability of the instruction sequence. Whenever the condition of the first status word of the cycle indicates that the cycle is in a nonexecutable condition, instructions of that cycle are not executed. This, however, does not interfere with execution of instructions of cycles for which the status words indicate the cycles to be in an executable condition.

Figure 7:
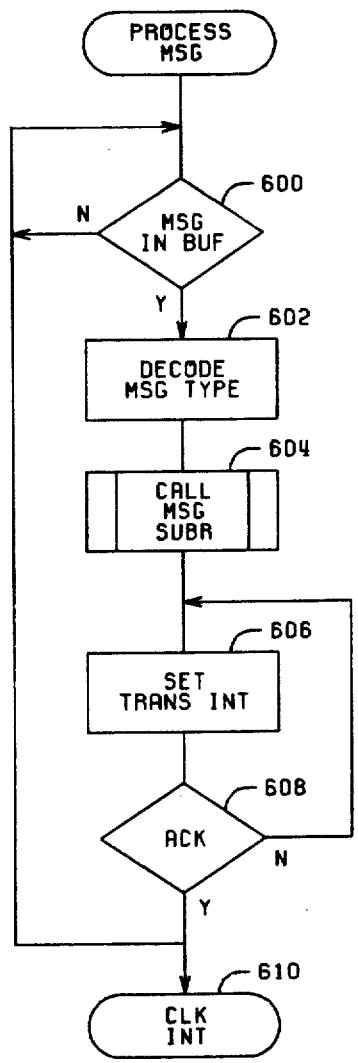
FIG. 7 is a flow chart of the overall message handling process.

Referring again to FIG. 2c, upon completion of the execution of instructions of the cycle list, the scan service interrupt routine is completed and processing is returned to message processing, step 108 of FIG. 2a. The overall procedure for processing messages is shown in FIG. 7. Referring now to FIG. 7, decision step 600 detects the presence of a message within the message buffer of storage area 74. The message type is decoded by process step 602 and the appropriate message subroutine is called by process step 604. Upon completion of the message subroutine, the transmit interrupt flag is set by process step 606 and when an acknowledge has been received by the external communications device as indicated by process step 608, the process continues by the return to the beginning of the procedure at decision step 600 and so this continues until a clock interrupt is received as indicated by terminal 610. The controller incorporates routines for processing message types to effect modifications of the stored program on a cycle by cycle basis. FIGS. 8a through 8c are illustrative of program modifying message types.

As previously stated, cycles for which the first status words indicate an unexecutable state may be modified. The first status word state to permit cycle modification is designated "blocked" signifying that cycle execution for the associated instruction sequence is blocked. The first status word of a selected cycle may be set to any of its permissible conditions including "blocked" by the message type subroutine of FIG. 8a. The "update state 1" message sets the state of selected bits of the first status word of the selected cycle by process step 620 of FIG. 8a. Message processing continues by the return through terminal 621.

Once the state of the first status word of a cycle has been set to blocked, the cycle code may be retrieved from the program store and transferred to the external device through the communications channel. Code modification may then be performed within the external device by means of text editing techniques. FIG. 8b is a flow chart of the cycle edit message subroutine which places the stored program in the message buffer for transfer to the external device. At process step 627 the status words of the cycle descriptor are set to initial conditions, the first status word continuing to indicate the blocked condition. Process step 628 transfers the instruction code from program store 62 to the message buffer of memory area 74. By the return of terminal 629 message processing is resumed to effect transmission of the cycle code to the external device.

When the modifications are complete, the modified cycle code is reloaded in program store 62 by transmission from the external device through the communications interface 76. FIG. 8c is a flow chart of the "cycle update" message type used to reload the modified cycle code in program store 62. Process step 623 transfers the modified code waiting in the message buffer to program store 62 and process step 624 loads modified cycle descripter information in store 64. Message processing is resumed through terminal 625. Two further message types permit the storing of totally new cycles and the removal from program store 62 of resident cycles.

When a new cycle instruction sequence is to be stored within cycle program store 62, a new cycle message type is transmitted and the message subroutine of FIG. 8d is called. At process step 630, a block of memory to receive the new cycle code is allocated. The cycle descriptor block area is allocated by process step 632 and the cycle descriptor is initalized by process step 634. Message processing continues through the terminal 636.

In order to delete an existing instruction sequence from the program store 62, a delete cycle message type is transmitted and when received within the buffer, the message subroutine of FIG. 8e is called. To delete the cycle, process step 640 removes the cycle descripter from the cycle list, step 642 deletes the code from the program store 62 and returns the now unused storage space to free storage. Process step 644 deletes the cycle name. Thereafter the message processing continues to the terminal 646.

In addition to the ability to modify the instructions stored in cycle program store 62, there are a number of message types for altering the entries in name table 70. These messages are necessary to compliment the modification of programs stored in the cycle program store 62. Clearly, the deletion or addition of cycle instruction sequences affect the contents of name table 70. The name table entries occupy fixed locations within table 70 but are alphabetically ordered by a data structure in the form of a binary tree. Although other data structures could be used with the fixed entry location approach, the binary tree presents advantages in processing time and memory space requirements. The binary tree is illustrated in FIG. 9a. Each name table entry with its associated information constitutes a node within the binary tree of FIG. 9a, the branches to succeeding nodes being represented by link data stored with the entry. Referring now to FIG. 1, the name table 70 is shown to include the name, the op store address, and a left link and a right link. The left link and right link are index values for the name table index which point to the following nodes to the left and right of the associated name table entry. Nodes to the left of the selected node are alphabetically lower than the selected node, and nodes to the right are alphabetically higher. The use of the binary tree data structure effects a conservation of memory space as compared to alternative applicable structures and enables the modifications of name table entries to be accomplished in the most efficient manner. It will be appreciated that before a name could be added or deleted to the name table, it must first be determined whether or not the name is present within the table. To accomplish this, a search through the binary tree is effected by a message type entitled "find name".

Figure 9:
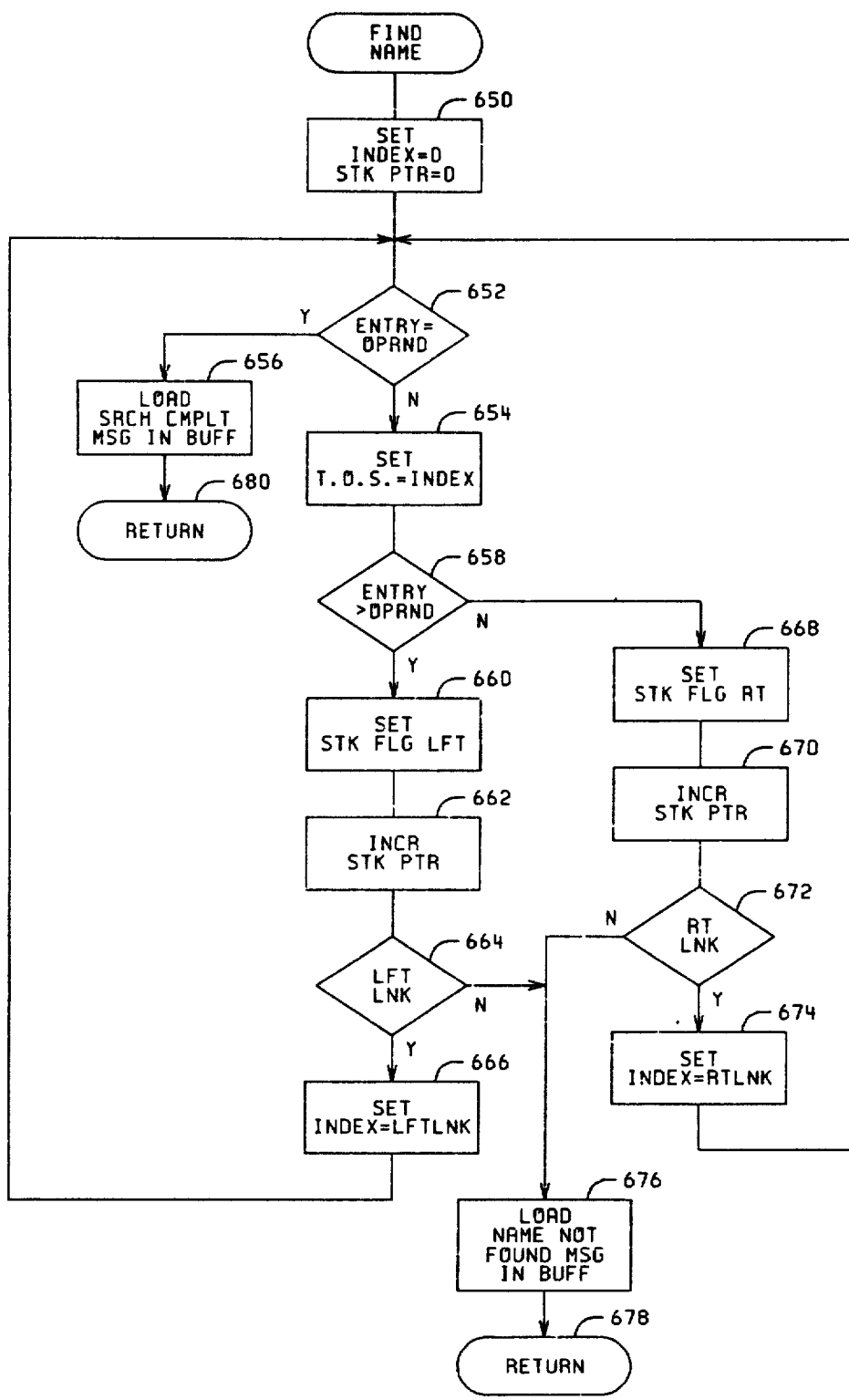
FIG. 9 is a flow chart of a variable name message routine for finding a name in the name table.

Referring now to FIG. 9, the "find name" message type routine is shown. Beginning at process step 650, the name table index is set to zero creating a dummy value and the search stack pointer used with a search stack for the name table is set equal to zero. The operand supplied in the find name message is compared to the name table entry indicated by the name table index at decision step 652. If the operand is not equal to the entry, which will always be the case with the dummy value, step 654 sets the top of the search stack equal to the current value of the name table index. Thereafter decision step 658 determines whether the entry pointed to by the name table index is greater than the operand supplied within the find name message and if not, again, this is always the case with respect to the dummy value, the search stack flag is set to the right value by process step 668 and the stack pointer is incremented by process step 670. The search stack flags are used to maintain a trail of directions taken in a search from the node at the associated stack entry. On the other hand, if the name table entry indicated by the name table index had been greater than the operand, then the stack flag would have been set to the left value by process step 660 and the stack pointer incremented by process step 662. Continuing now at process step 672, corresponding to the condition that the supplied operand is greater than the name table entry, the name table entry is tested to determine whether or not it has associated with it a right link. If not, the current operand is not available within the name table and the process step 676 effects the loading of the name not found message within the message buffer, thereafter, message processing continues by terminal 678. If, on the other hand, decision step 672 had determined that the current entry in fact had a right link then the index is set equal to the index value at the right link and the process is repeated by the return to the decision step 652. In a similar fashion, where the operand is determined to be less than the name table entry, decision step 664 determines whether or not the indicated name table entry has an associated left link and if so, the name table index is set equal to the value indicated by the left link and the process again would continue at decision step 652. Assuming that the process is continued by one return route or the other, when the operand value is found to be equal to the entry pointed to by the name table index, process step 656 effects the loading of the search complete message in the message buffer and the message processing continues by terminal 680. It will be appreciated that if the name is to be added to the name table, the result of the find name routine is to indicate the last node of the binary tree to which the operand shall be appended as either a left link or a right link. On the other hand, if the operand supplied in the find name message is an operand which is to be deleted from the name table, then the result of the find name routine is to locate the name to be deleted within the binary tree.

Referring again to FIG. 9a, it will be appreciated that as nodes of the tree are added or deleted, the effect is to cause an imbalance of the structure of the tree. Applicants have chosen an algorithm to maintain a tree balance based upon the furthest node from a selected node. That is, whenever the furthest node from a selected node going in one direction is further from the selected node, than the furthest node from the selected node going in the other direction by more than one link then it is considered that at the selected node, the binary tree is out of balance. The consequence of an unbalanced condition within the binary tree is to effect additional complexities in subsequent searches and modifications to the tree. Therefore, applicants have chosen to restore a balanced condition at the completion of any addition or deletion that causes an imbalance in the binary tree. Additional details of balancing routines shall be discussed hereinafter.

Figure 10:
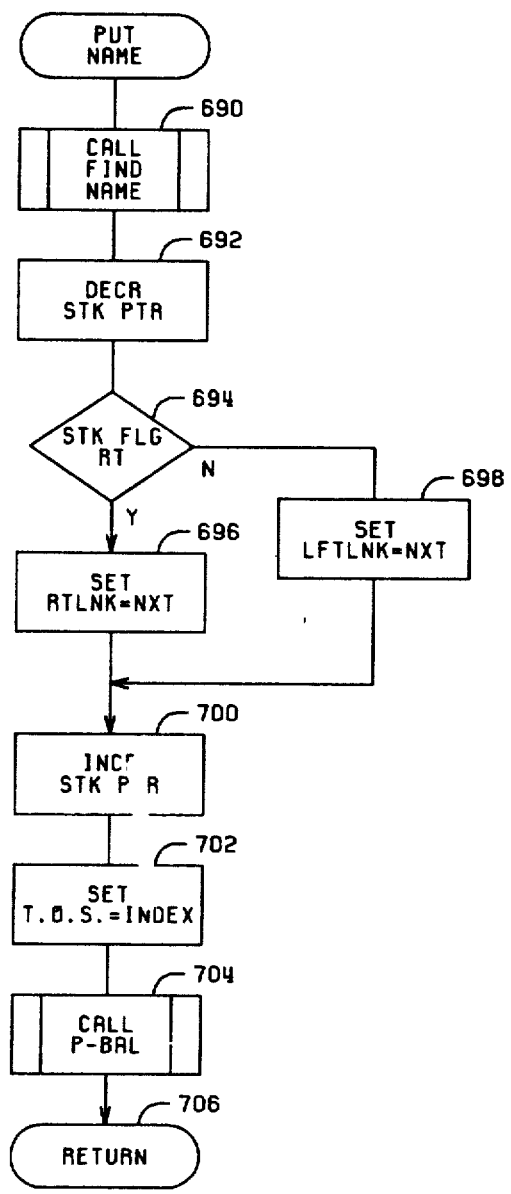
FIG. 10 is a flow chart of a variable name message routine for adding a name to the name table.

Referring now to FIG. 10, the message subroutine for the "put name" message type is shown. This message type effects the addition of a name to the name table and consequently an addition to the structure of the binary tree. The message subroutine begins at process step 690 by calling the find name subroutine which has been described with reference to FIG. 9. Upon completion of the find name subroutine, process step 692 decrements the search stack pointer to cause the search stack to be pointing to the last entry made to the search stack. Decision step 694 tests the stack flag to determine whether the associated stack flag of that entry is equal to the left or right value, indicating whether the name to be added is larger or smaller than the entry. If it is equal to the right value, then the right link of the name table entry indicated by the name table index is set to the name table index value of the next available space in the name table. Conversely, if the search stack flag is not equal to the right value as determined by decision step 694, then the left link of the name table entry indicated by the index is set equal to the value of the next available space by process step 698. Thereafter, the process continues at process step 700 which increments the search stack pointer. This places the pointer value to the next available space of the search stack and then the current index value is loaded into the top of the stack by process step 702 making the top of stack entry the index of the predecessor of the added name. Process step 704 calls a balance routine to be effected following the addition of a name to the name table and after execution of that balancing routine the message processing continues by the return of terminal 706. If will be appreciated by those skilled in the art that the affect of the routine of FIG. 10 is to force the value of the left or right link at the bottom of the binary tree located by the find name routine to the value of the new name table entry. The balancing routine called by process step 704 shall be described in detail subsequently.

Figure 11A:
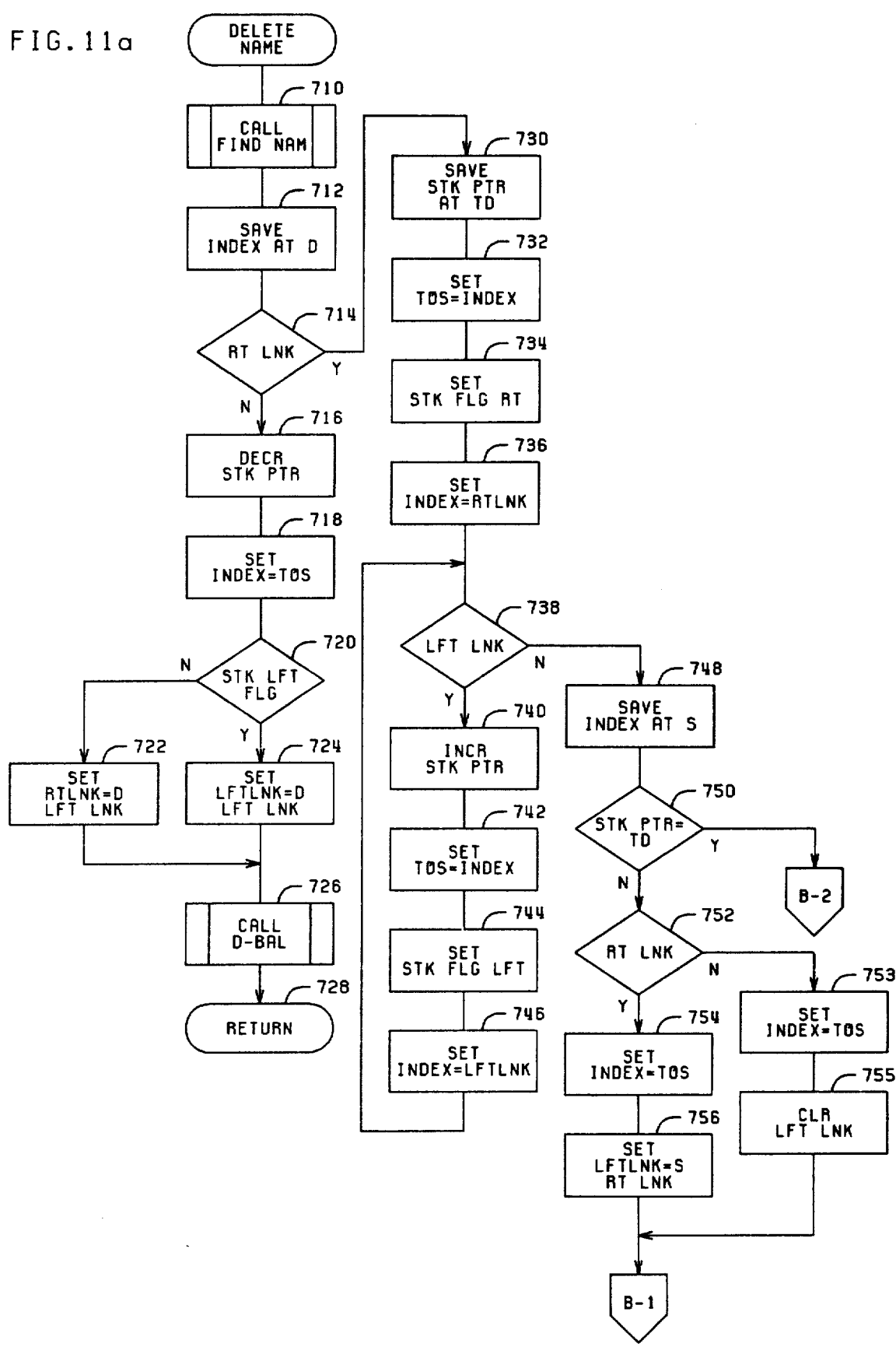
FIGS. 11a to 11b is a flow chart of a variable name message routine for eliminating a name from the name table.
Figure 11B:
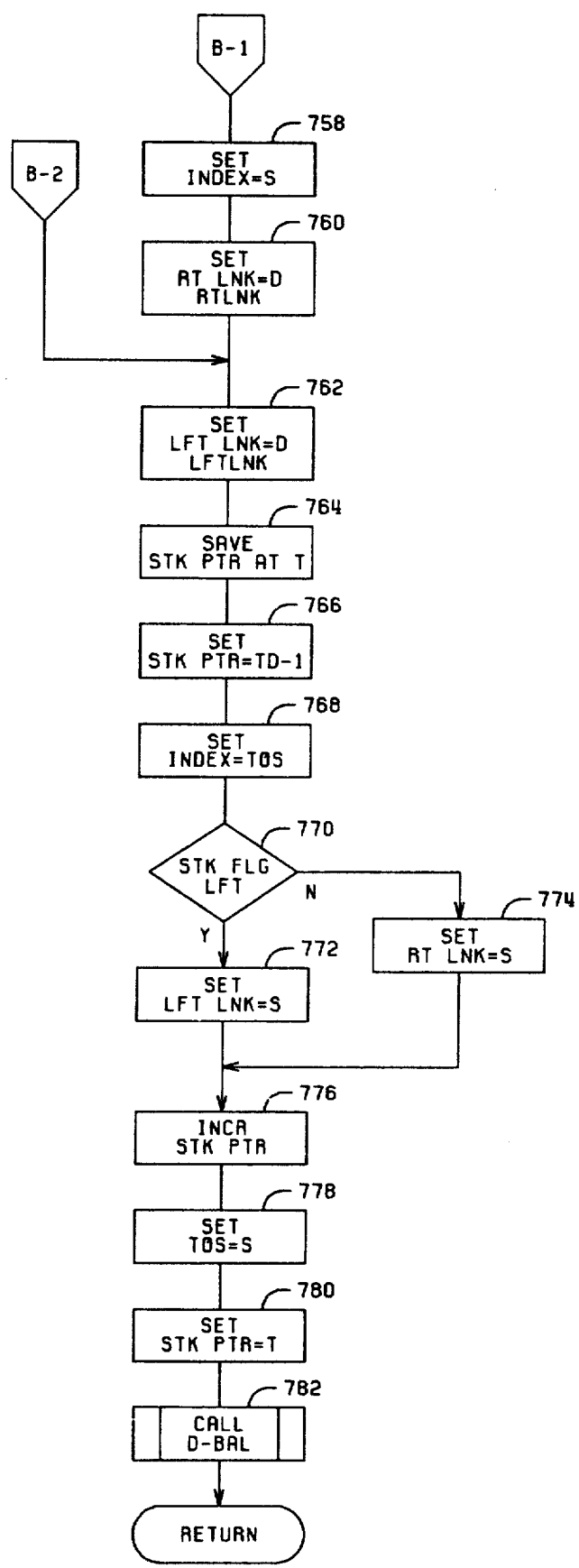

Referring now to FIGS. 11a and 11b, the routine for a delete name message type is shown. This message type effects the elimination of a name from the name table and the initiation of a balancing routine to balance the binary tree following the deletion of a node therefrom. The delete name routine begins at process step 710 by calling the find name message routine shown and described with reference to FIG. 9. As the find name routine shall locate the entry supplied as the operand with this message type, the name table index will be pointing at the entry to be deleted. Process step 712 saves the name table index for purposes of this routine at a location identified as D. Decision step 714 determines whether or not the entry to be deleted has a right link. If not, the search stack pointer is decremented by process step 716 and the index is set equal to the value at the top of the stack by process step 718, that is, the predecessor of the name to be deleted. Thereafter, the search stack flag is tested for equality with the left value by decision step 720 and depending on whether or not the search stack flag is equal to left or right the appropriate link of the current name table entry indicated by the name table index is made equal to the left link of the name table entry to be deleted. This is accomplished by process step 722 or 724 setting either the right link or the left link to the left link of the entry whose index has been saved at D. Thereafter, the balancing routine to rebalance the binary tree is called by process step 726 and upon completion of the balancing routine the message processing continues through the terminal 728. The effect of the process step 718 through 724 is to force the appropriate link of the predecessor node of the deleted node to point to the node succeeding the deleted node at the deleted node's left link. This is all conditioned upon the deleted node not having a right link.

In the event that the deleted node indeed has a right link, the process will have followed the "yes" side of decision step 714 to process step 730 wherein the search stack pointer would be saved at a location designated as TD. At process step 732, the current top of stack is set equal to the current index value and the stack flag is set to right by process step 734. The index is then set equal to the value indicated by the right link of the current name table entry by process step 736 and the right link entry is then examined to determined whether or not it is followed by a left link at decision step 738. If this name table entry does not have a left link, then process step 748 saves the value of the index at S indicating that this is the value of the successor node of the deleted entry and decision step 750 determines whether or not the current value of the stack pointer is equal to the value saved at TD. If so, as would be the case if the successor did not have a left link, then the pocess continues through the off-page connecter B2 to process step 762. There the left link of the successor is set equal to the left link of the deleted entry and process step 764 saves the current stack pointer at a location T. Process step 766 sets the search stack pointer equal to the value saved at TD - 1 and process step 768 then forces the index to the value at the top of stack. The effect of process steps 766 and 768 is to set the index equal to the name table entry of the predecessor of the entry to be deleted. Decision 770 tests the stack flag of the predecessor to determined whether or not it is set to the left or right value and then process steps 772 and 774 set the appropriate link equal to the value of the index saved at S, being the value of the successor to the deleted entry. Thereafter, process step 776 increments the stack pointer, effectively making the stack pointer equal to the value saved at TD. Process step 778 sets the indicated top of stack equal to the index value of the successor and process step 780 advances the stack pointer to the value saved at T. Thereafter, the delete balance routine is called by process step 782.

If, at decision step 738 of FIG. 11a, it had been determined that the right link entry of the deleted entry was followed by a node to the left then the loop indicated by process steps 740 through 746 would cause the index to be advanced to the node furthest down to the left of the right link node of the deleted entry. Upon completion of this routine, the final test for a left link would indicate there is no further left link and the index value would be saved at S again indicating that this distant left mode is the successor of the name table entry to be deleted. Thereafter, decision step 150 would determine that the search stack pointer is not equal to the value saved at TD and a test at decision step 752 would be made to determine whether or not the successor node is followed by a right link. If not, the index would be set equal to the value at the top of the stack by step 753 and the left link, being the left link of the predecessor of the successor would be cleared by step 755. The process would then continue through offpage connector B1 at process step 758 where the index would be set equal to the successor value and the right link of the successor would be set equal to the right link of the deleted entry. On the other hand, if it was determined that the successor did in fact have a right link, then the index would be set equal to the value at the top of the stack at step 754 and the left link of this value would be set equal to the successor right link at step 756. Thereafter, again, the process continuing through the offpage connecter B1.

It will be appreciated that the effect of the link modifications within the delete name message type subroutine serve to connect the successor node of the deleted entry to the predecessor node of the deleted entry. The rebalancing of the binary tree after an entry has been deleted shall be described in detail with reference to FIGS. 14a and 14b, subsequently.

A message type of additional interest is the message which effects a reassignment of the interface circuit of one of the I/O modules 42 through 60 to the variable name stored in the cycle program store 62. An advantageous consequence of permitting the use of variable names in the cycle program store is that the allocation of interface circuits does not require modifications to the stored program. In the event that a reallocation of an interface circuit is necessitated due to a component failure an unused interface circuit may be assigned to the appropriate variable name. As has already been described, with reference to the I/O exchange update routine the current status of interface circuits associated with input devices is transferred to the I/O device image of the operand store and values therein can then be accessed by the execution of the appropriate addressing mode subroutine by processor 14. Conversely, the resultant of the execution of a cycle instruction which effects a change in the state of an interface circuit associated with an output device is again accomplished through the I/O device image of operand store 72. In order to reassign an interface circuit to a variable name, it is only necessary to modify the appropriate mask of operand store 72 and the associated operand store address and type of name table 70.

Figure 12:
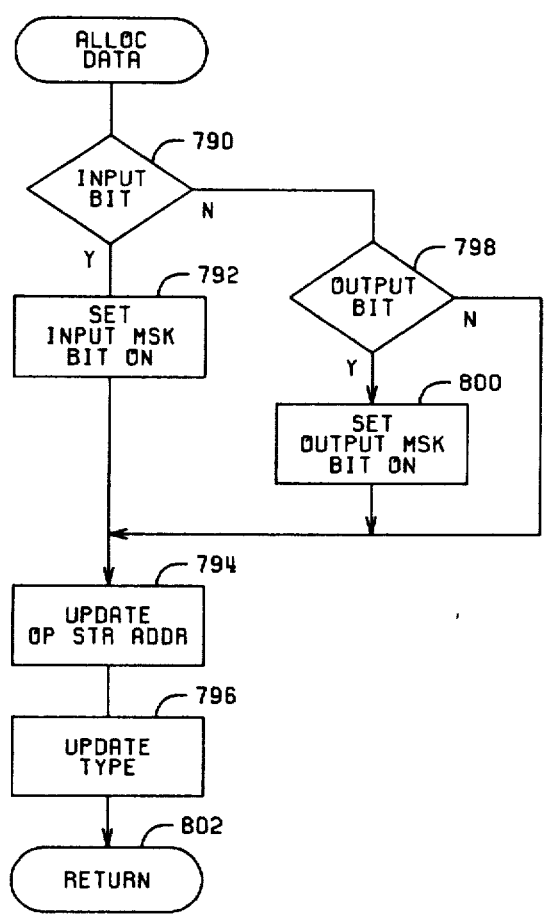
FIG. 12 is a flow chart of an interface circuit reassignment message routine.

Referring now to FIG. 12, the allocate data message type is shown. Execution of this message type does not require that the cycle of interest be set to an unexecutable condition. Decision step 790 determines whether or not the interface circuit of interest is an input bit type. If so, the appropriate bit of the input mask is set "on" by processor 792 and the operand store address for the designated variable name is updated by process step 794. The operand type is updated by process step 796. If the bit to be allocated was not an input bit, then decision step 798 determines whether or not it is an output bit. If so, the appropriate bit of the output bit mask is set "on" by process step 800 and the process continues through step 794 and 796. Message processing continues by return through terminal 802. In the event the data to be allocated is neither an input nor an output bit, it may be an internal bit or an operand word and no change need be made to either the input or output bit masks and only the entries in the name table are updated as indicated by the path following the no side of decision steps 790 and 798.

Figure 13:
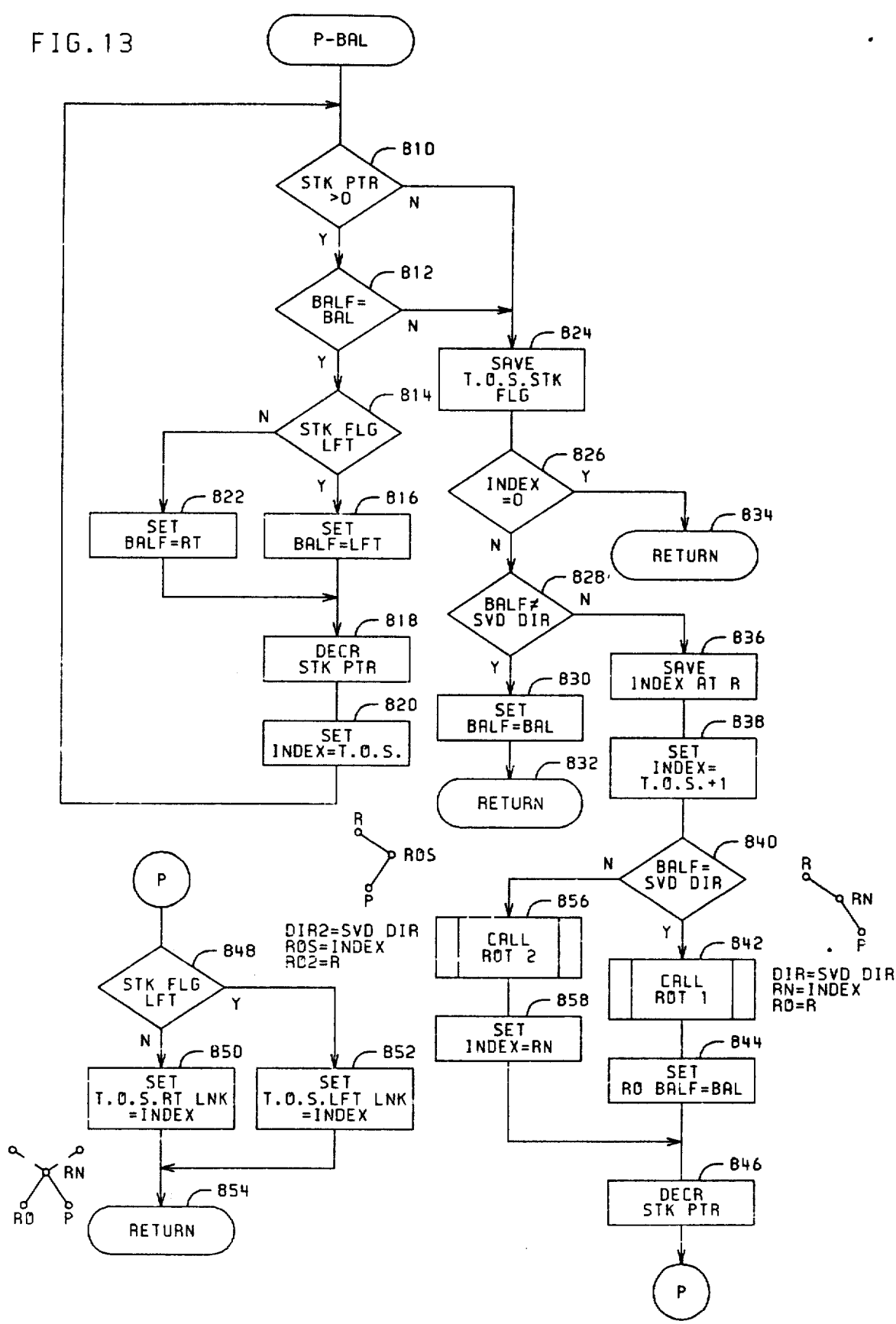
FIG. 13 is a flow chart of a name table balancing routine for balancing the binary tree following the addition of a name to the name table.

As was previously stated, when entries are added or deleted to the name table it is necessary to rebalance the binary tree. In particular, two distinct balancing routines are required depending on whether or not a name has been added or deleted from the name table. Referring now to FIG. 13, the balance routine called following the addition of a name to the name table is shown. Reiterating, it is the purpose of the balancing routine to insure that the furthest node from either side of a selected node is no more than one link further from the selected node than the furthest node from the selected node on the other side of the selected node. Following the addition of a node to the binary tree, the name table index indicates the predecessor of the added node. Associated with each node of the binary tree is a further value identified as a balance factor. The balance factor indicates whether the most distant nodes to the left and right are equidistant or one or the other is one link more distant. Thus, the balance factor may indicate a balance condition, or a left or right imbalance condition.

The "put balance" routine begins at decision step 810 of FIG. 13. The stack pointer is tested to determine whether or not the search stack pointer is greater than zero and if so the balance factor of the predecessor node is tested for equivalence with balance by decision step 812. If the predecessor node was balanced prior to the addition of the new name table entry then decision 814 determines whether or not the direction from the predecessor was left or right by examining the search stack flag. If left, the balance factor of the predecessor is set equal to the left value by process step 816 and if not the balance factor is set equal to the right value by process step 822. Thereafter, the search stack pointer is decremented by process step 818 and the index is set equal to the value at the top of the stack by process step 820. The process continues by return to decision step 810 to determine whether or not the stack pointer has now been reduced to zero and if not the process continues through the decision step 812 and 814 until a node is reached which was on the trail of the new name table entry at which the balance factor was not balanced.

When the stack pointer is indicating the first entry of the stack or when the imbalanced node in the trail of the new name table entry has been located, the process continues at process step 824 wherein the top of stack stack flag value is saved. Thereafter, the decision 826 tests the value of the index to determine whether or not the index is now indicating a dummy value of zero and if so, the rebalancing is complete and the message processing continues by the return through terminal 824. Assuming that the index is not equal to the dummy value, zero, then decision step 828 tests the balance factor of the current index to determine whether or not it is not equal to the saved direction from the process step 824. If the current balance factor is not equal to the saved direction, then it is necessary only to set the balance factor of this node equal to balance as indicated by process 830 and the rebalancing procedure is complete and message processing continues by the return through terminal 832.

If, on the other hand, the balance factor of the current name table entry indicated by the index is equal to the saved direction, then it will be necessary to effectively rotate the nodes depending from the currently indicated node. That is, it will be necessary to rearrange the nodes on the binary tree to reestablish the balance condition. This is accomplished through the process steps beginning with the save of the index at process step 836 and continues with the setting of the index equal to the value on the search stack one beyond the top of the stack, that is, the predecessor of the imbalanced node. Thereafter, the balance factor in this node is tested for equality with the saved stack flag direction and if there is equality, the process step 842 calls a routine to effect a single rotation of the nodes about the predecessor location. Thereafter, process step 844 forces the balance factor of the old predecessor equal to balance. The process then continues by decrementing the search stack pointer by process step 846, the stack flag is tested to determine the direction of the trail leading to the old predecessor and the appropriate link is set by process stpe 850 or 852 to indicate the new value of the appropriate link. Thereafter the process processing of messages continuing through the terminal 854. Referring now to the decision step 840, if the balance factor had equalled the saved direction of the predecessor it would be necessary to do an additional modification and the appropriate subroutine is called by process step 856 to determine a new predecessor value. The index is set to the new value by process step 858 and thereafter the process continues through steps 846 and 852 as before. The realignment of links affected by the balancing routines in particular by the rotate one and rotate two subroutines shall be described in more detail subsequently. The schematic diagrams in the margins to either side of decision step 840 are illustrative of the imbalance conditions requiring the execution of the rotate routines. The node names of these diagrams correspond to the variables supplied to the subroutines when called.

Figure 14A:
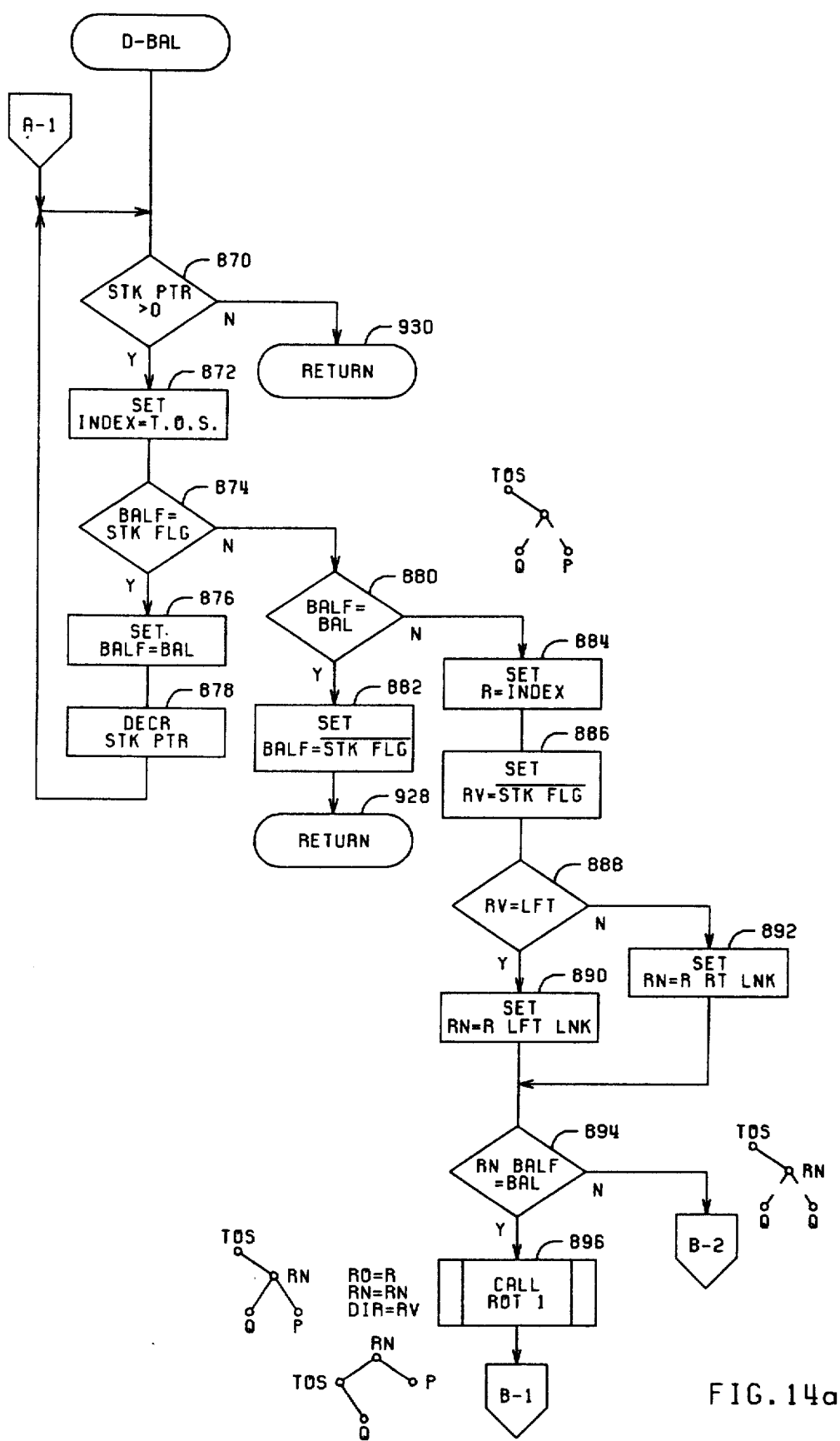
FIGS. 14a to 14b is a flow chart of a name table balancing routine for balancing the binary tree after deleting a name from the name table.
Figure 14B:
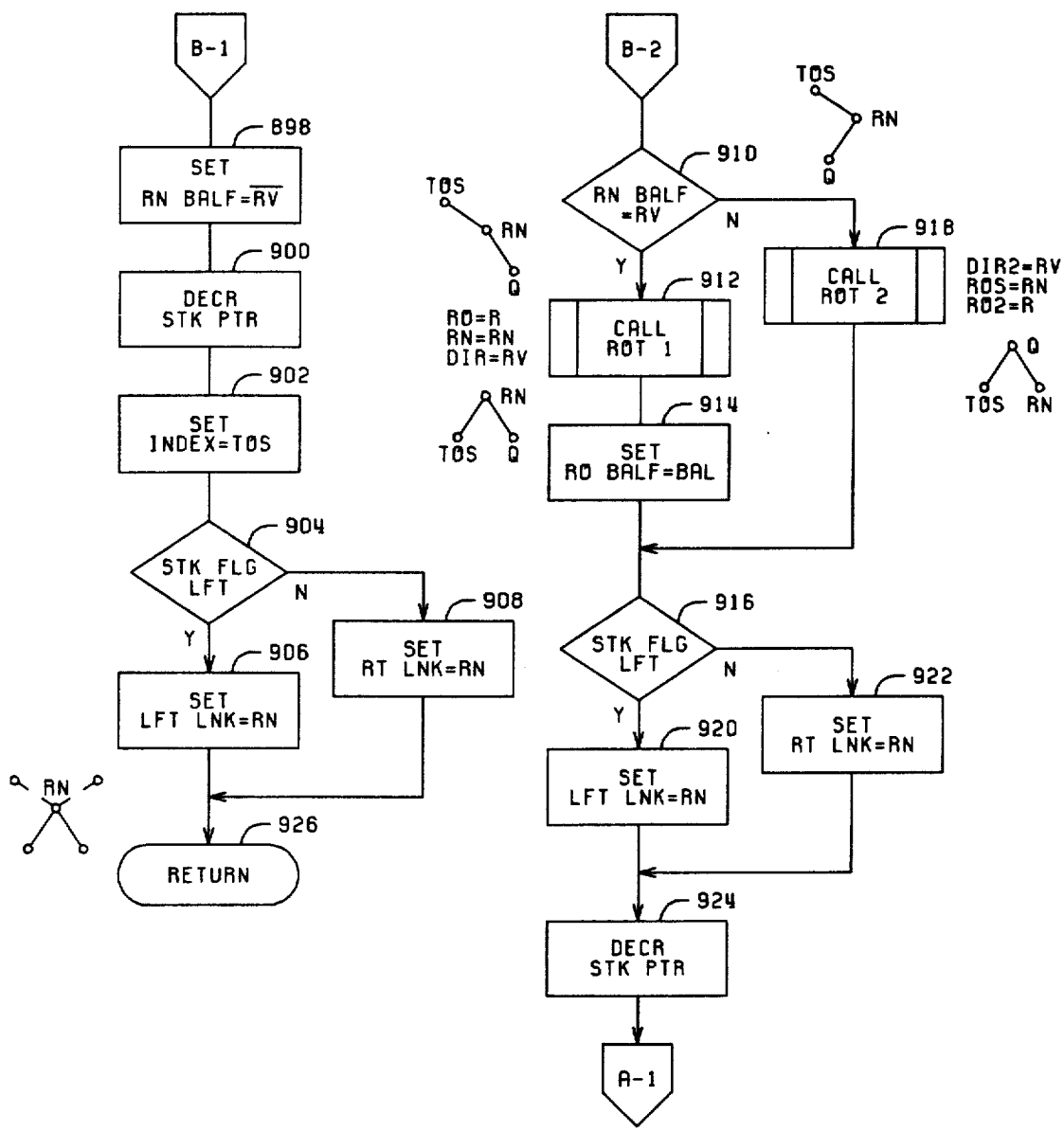

FIGS. 14a and 14b are a flow chart of the balancing routine called following the deletion of a name from the name table. Following deletion of a name, the name table index is indicating the predecessor of the deleted name. At decision step 870, the stack pointer is examined to determine whether or not the stack pointer is currently greater than zero and if not then there is no need to continue, the balance condition being assumed. However, provided the stack pointer is greater than zero, process step 872 sets the index equal to the value at the top of the stack which corresponds to the successor entry of the deleted entry. Decision 874 determines whether the balance factor of the successor is equal to the stack flag direction from the current top of the stack and if it is, the balance factor is set equal to balance by process step 876 and the stack pointer is decremented by process step 878 to continue the loop started at decision step 870. This loop effects the retracing of the trail established by the delete name routine to locate the successor of the deleted entry. When decision step 874 determines that the balance factor is not equal to the stack flag, the process proceeds to decision step 880 where the balance factor is tested against the balance value. If the balance factor is equal to balance for the node of interest, then the balance factor is forced to the inverse of the value of the current stack flag by process step 882 thus completing the balancing routine as indicated by the terminal 928. Assuming that decision 880 determines that the balance factor was not equal to balance, then the process continues to the branch on the no side of decision step 880 to effect a rotation of nodes of the binary tree. At this point, the imbalance condition may correspond to that depicted in the schematic diagram wherein the furthest node from the top of stack is two links removed from the top of stack and may be either the left or right dependent of the top of stack successor. Further, the top of stack successor may be followed by both a left and right dependent. Process step 884 creates the value of R used in the required rotation by setting R equal to the current index. Process step 886 sets the rotation direction vector equal to the inverse of the current stack flag and decision step 888 determines whether the rotation vector indicates a left or right rotation and sets the value of the new root node equal to the left or right link of the index by steps 890 or 892. At decision step 894, the new root node balance factor is tested to determine whether or not it indicates a balance condition and if so, the single rotate routine is called by process 896. The new root node has thus been determined to be succeeded by both a left and right dependent as illustrated to the left of step 896 whereas if not the process continues through off-page connector B2 to FIG. 14b at process step 910 where the additional test of the new route node balance factor is made for equality with the rotation direction vector. It is known at this point that the new root node has a single dependent but the direction is not yet known as illustrated to the right of step 894. If it is not equal, then the double rotate routine is called by process step 918 the dependent being to the left and if it is equal, the single rotate routine is called by process step 912 the dependent being to the right. At process 914, the old root node balance factor is forced equal to balance and thereafter, the process continues at decision step 916 where the stack flag value is tested to determine the direction from the predecessor and the appropriate link is set equal to the new root node index as indicated by steps 920 and 922. Thereafter, the stack pointer is decremented at process step 924 and the overall loop continues through off-page connector A1 at decision step 870 of FIG. 14a. By which means the trail of the deleted entry's successor is rebalanced.

Referring once again to FIG. 14a, had the process step 896 effected the execution of a single rotate, then the procedure would continue through off-page connector B1 to FIG. 14b at process step 898 where the new root node balance factor would be set equal to the inverse of the rotation direction vector and therefrom to process step 900 where the stack pointer is decremented. Thereafter, the index is set equal to the value currently at the top of the stack and the stack flag is tested for its direction by decision step 904 and the appropriate link of the current name table entry indicated by the index is set to the new root node value by process step 906 and 908. Message processing continues through terminal 926.

Referring now to FIGS. 13, 14a, and 14b, it is seen that in association with calling the single rotate and double rotate routines there is an assignment of certain variables. In particular, upon calling the single rotate routine, the rotate direction variable is given a value, the new root node variable is assigned a value and the old root node variable is assigned a value. By contrast, upon calling the double rotate routine, the new root node is unknown and is to be determined whereas the direction of rotation is assigned a value, the old root node is assigned a value, and the old root node successor variable is assigned a value, all variables to be used by the called routine.

Figure 15A:
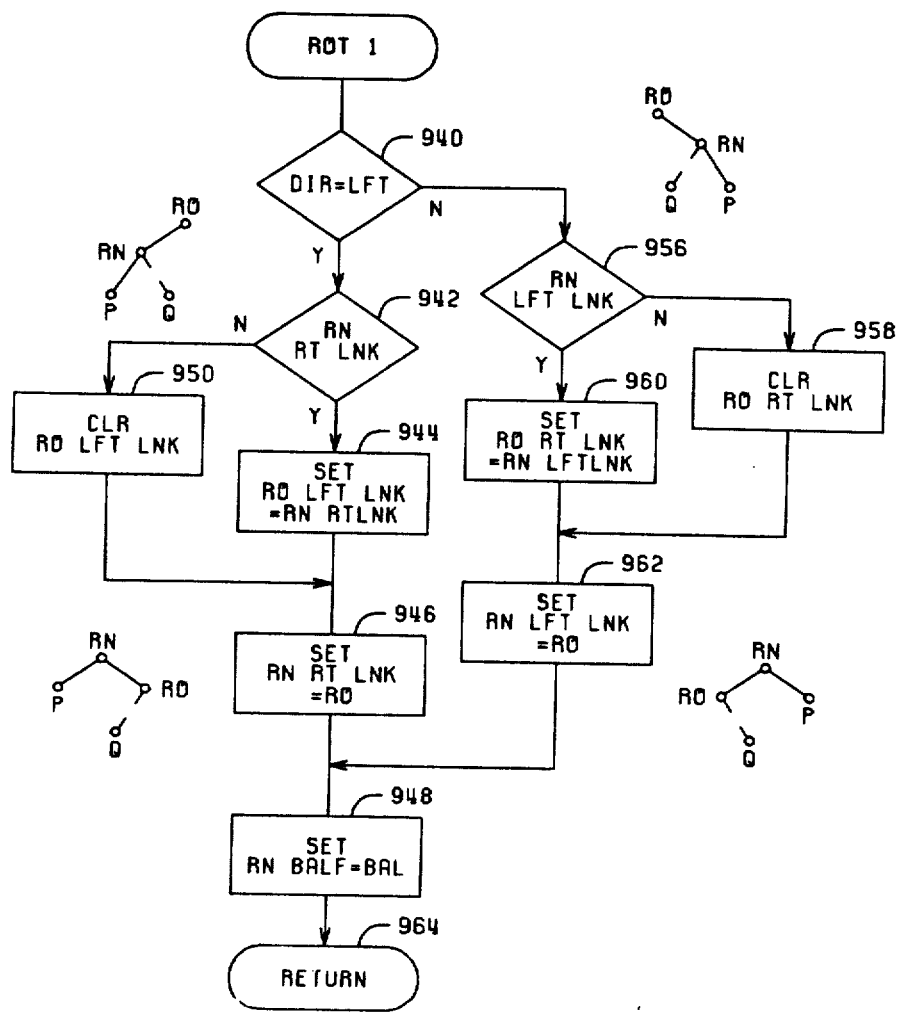
FIGS. 15a and 15b are flow charts of balancing subroutines used by the add and delete balance routines.

Referring now to FIG. 15a, the single rotate subroutine is shown. Beginning at the decision step 940, the value of the direction variable is tested and if equal to left, then the decision step 942 determines whether or not the new root node has a right link. Following decision step 940, the nature of the imbalance at the old root node is known to correspond to that illustrated to the left or right of the step. If the new root node has a right link, then process step 944 sets the old root node left link equal to the new root node right link. If, on the other hand, the new root node did not have a right link, then process step 950 clears the old root node's left link. At process step 946, the new root node's right link is set equal to the old root node. And at process step 948 the new root node's balance factor is set equal to balance. If the direction had been equal to right, then decision step 956 tests whether the new root node has a left link; if it did, process step 960 sets the old root node right link equal to the new root node's left link. If the new root node did not have a left link then process step 958 clears the old root node's right link. Following either process step 960 or 958, process step 962 sets the root node's left link equal to the old root node.

It will now be appreciated that the reassignment of link values effected by the balancing routine shifts the positions of nodes within the tree to rebalance the binary tree. The rotated nodes assume the relative positions shown by the diagrams to the left and right of step 946. The phantom link indicating that there may be a further dependent present and its final relative position.

Figure 15B:
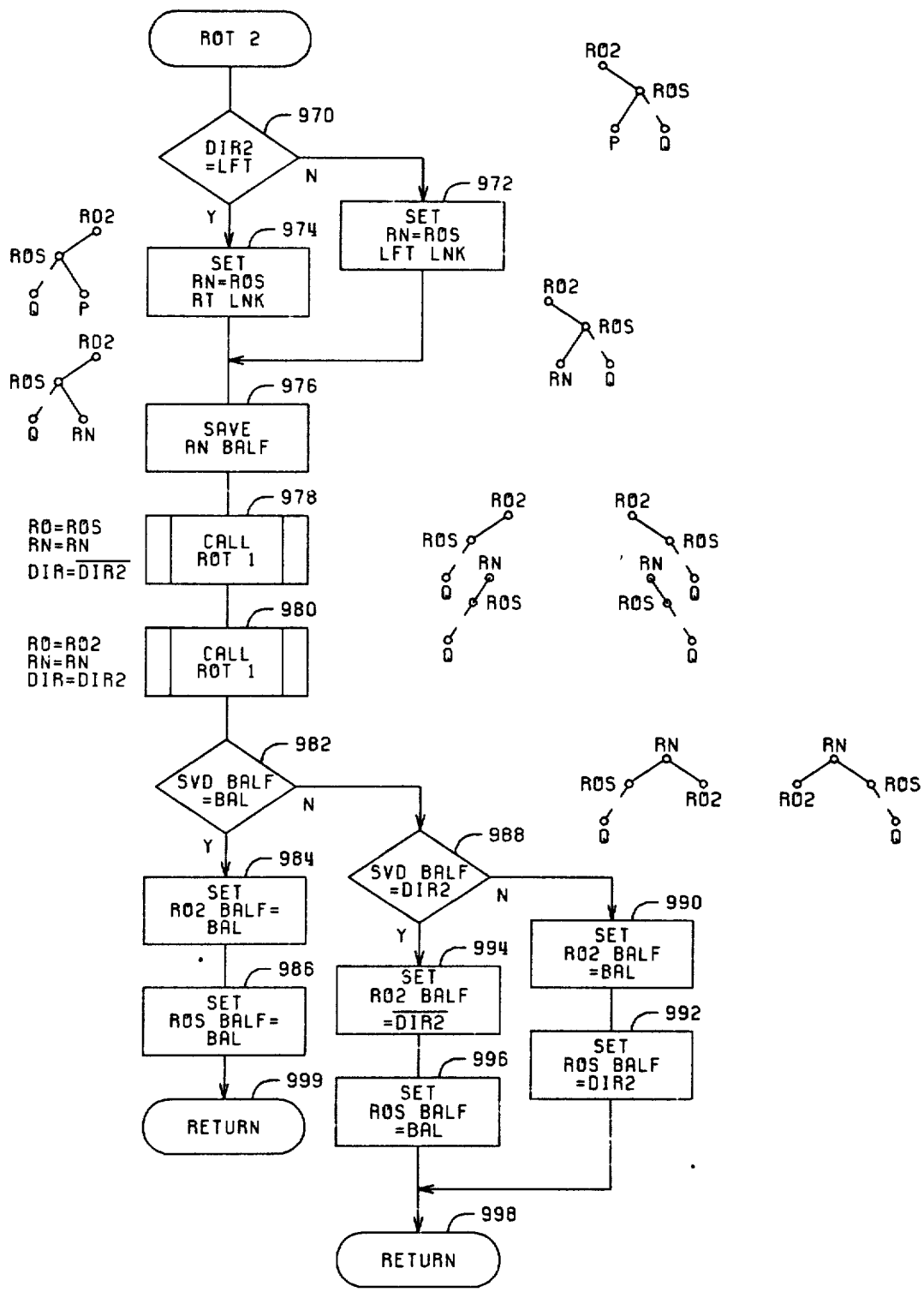

Referring now to FIG. 15b, the double rotate routine is shown. At decision step 970, the value of the direction variable is tested to determine left or right; the detected imbalance condition being represented by the diagrams left and right at step 970. If the direction is left, the new root node variable is assigned the value of the old root node successor right link by process step 974. If the direction vector is right, the new root node variable is assigned the value of the old root node successor left link by process step 972. After assigning a value to the new route mode variable, the structure corresponds to the diagrams to the left and right of step 974. Process step 976 saves the new root node balance factor and process step 978 calls the single rotate routine assigning the variable values as shown. Having executed the single rotate routine, producing one of the intermediate results shown to the right of steps 978 and 980, process step 980 once again calls for execution of the single rotate routine, this time using the variable value assignments as shown to the left thereof. The resultant structure corresponds to one of those shown right of step 982. Thereafter, decision step 982 determines whether or not the saved balance factor from process step 976 is equal to balance, if so process step 984 sets the old root node double rotate variable balance factor equal to balance and process step 986 sets the old root node successor balance factor equal to balance. The balancing routine is continued through the return of terminal 999. If at decision step 982, the saved balance factor had been found not equal to balance, then decision step 988 tests whether the saved balance factor is equal to the value of the direction of the double rotate direction variable and if so process step 994 sets the old root node double rotate variable balance factor equal to the inverse of the double rotate direction. Thereafter, process step 996 sets the old root successor balance factor equal to balance and the balancing routine would continue through the return of terminal 998. If at decision step 988, the saved balance factor was found not equal to the double rotate direction variable, process step 990 would be used to set the old root node double rotate variable balance factor equal to balance. Thereafter, process step 992 would be used to set the old root successor balance factor equal to the direction variable of the double rotate routine and balance processing would continue through terminal 998.

PROGRAMMING EXAMPLE

The following programming example sets forth the mechanism cycle programs for control of the traffic light at an intersection. Three mechanism cycles of operation are described. A first cycle controls the state of the lights of the traffic light. A second cycle controls the sequence of operation of the traffic signal at the intersection and a third cycle counts the number of cars waiting at the intersection on the main street. The traffic light cycle is intended to maintain a green light for the main street until the internal bit is set indicating that traffic is to flow through the intersection from the side street and then change the light on main to red, change the light on side to green and maintain that condition until an internal bit is set indicating that the traffic flow through the intersection is to be along main street while the traffic at side street shall be stopped. The sequencer cycle is intended to allow the traffic to flow on the main street for fifteen seconds, and then, if a car is waiting at side street, to change the traffic signal to allow traffic to flow through the intersection from side street while stopping the traffic on main street. Thereafter, the sequence will allow the traffic to continue along side street for fifteen seconds or until five or more vehicles are waiting at the intersection on main street. The main car counter cycle is used to count the number of cars waiting on main street at the intersection.

| Cycle Name - Traffic Light | | |
|---|---|---|
| Instruction | Address Mode | Operand |
| Nop | | |
| Set on | Bit Name | Main Green |
| Set on | Bit name | Side red |
| Set off | Bit name | Main amber |
| Set off | Bit name | Main red |
| Set off | Bit name | Side green |
| Set off | Bit name | Side amber |
| Wait true | Bit name | Main to Side |
| Set off | Bit name | Main green |
| Set on | Bit name | Main amber |
| Delay seconds | Literal | 4 |
| Set off | Bit name | Main amber |
| Set off | Bit name | Side red |
| Set on | Bit name | Main red |
| Set on | Bit name | Side green |
| Wait true | Bit name | Side to Main |

| Cycle Name - Traffic Light (-continued) | | |
|---|---|---|
| Instruction | Address Mode | Operand |
| Set off | Bit name | Side green |
| Set on | Bit name | Side amber |
| Delay seconds | Literal | Four |
| Jump | | Nop |

| Cycle Name - Sequencer | | |
|---|---|---|
| Instruction | Address Mode | Operand |
| Nop | | |
| Delay sec. | Literal | 15 |
| Wait true | Bit name | Side car |
| Set on | Bit name | Main to Side |
| Wait true | Bit name | Main green |
| Ld. Wd. Accum. | Literal | Zero |
| Store Wd. Accum. | Word name | Main car count |
| Store Wd. Accum. | Word name | Time to go |
| Start | Bit name | Side timer |
| Wait expr. | | |
| Ld. wd. accum. | Word name | Main car count |
| Compare | Literal | 5 |
| Invert bit accum. | | |
| Push bit accum. | | |
| Ld. bit accum. | Bit name | Side timer |
| Or | Tos | |
| Wait true accum. | | |
| Set on | Bit name | Side to Main |
| Set off | Bit name | Side car |
| Wait false | Bit name | Main green |
| Jump | | NOP |

| Cycle Name - Main Car Counter | | |
|---|---|---|
| Instruction | Address Mode | Operand |
| NOP | | |
| Wait true | Bit name | Main car switch |
| Ld. wd. accum. | Word name | Main car count |
| Add | Literal | One |
| Store wd. accum. | Word name | Main car count |
| Wait false | Bit name | Main car switch |
| Jump | | NOP |

It will be appreciated by those skilled in the art with reference to the example program that the overall traffic control at the intersection may be viewed as three mechanism cycles of operation. One concerns the traffic light operation, the other is the cycle dealing with the overall sequence of events and the third, being a cycle to maintain a count of traffic on Main Street. By the use of variable names within the program, it is not necessary to cconstruct the program with reference to particular interface circuits as might be used to control the traffic lights or the side car switch or the main car switch. Further, by treating each of these operations in an independent fashion, the overall process control is greatly simplified. In addition, as the sequencer cycle of operation has been made selectively dependent upon the main car count and the side timer, the main car count cycle could be inhibited and modified while the sequencer and traffic light cycles could continue to execute. It is apparent from the operand names selected in the foregoing example, that the function of program generation is greatly simplified in that the program variable names may be freely chosen at the time of program generation without reference to the controller system hardware. Further, internal bits are shown to be as freely named as for example "Main to Side" and "Side to Main". As has been previously stated, the actual assignment of controller interface circuits to the selected variable names is an independent operation of the basic program generation and reassignment of interfaces is permitted during program execution.

While the invention has been described in considerable detail with regard to the preferred embodiment, it is not intended by applicants to so restrict the scope of the present invention to this detail. It is the intention of applicants to cover all modifications, alterations, and equivalents falling within the spirit and scope of the appended claims.

What is claimed is:

1. Apparatus for controlling the operation of a system in response to a program of operation including a plurality of instruction sequences defining mechanism cycles of operation, the instructions relating sensed conditions of input devices, selectable conditions of output devices, and variable values, and the input and output device conditions being represented by unique interface signals, the apparatus comprising:
   (a) means for storing a plurality of instructions signals representing the mechanism cycles of operation;
   (b) means for storing mechanism cycle status signals, each status signal respresenting the executability of the sequence of instructions defining a mechanism cycle of operation;
   (c) processing means responsive to the instruction signals, and the status signals for executing the instructions of a mechanism cycle for which the status signal represents an executable condition;
   (d) means responsive to the unique interface signals and the processing means for altering the condition of a selected unique interface signal associated with an output device, thereby controlling the output device in accordance with the current condition of selected input devices in the stored program;
   (e) communication means for exchanging message signals with a data communication device; and
   (f) means responsive to the status signals and the message signals for selectively adding, deleting, and modifying a mechanism cycle for which the status signal represents a non-executable condition of a mechanism cycle, the adding, deleting, and modifying of the nonexecutable mechanism cycle being effected concurrently with execution of instructions of executable mechanism cycles.

2. The apparatus of claim 1 wherein the means for altering the interface signals further comprises:
   (a) means for simultaneously storing current condition signals representing the current state of all the unique interface signals;
   (b) means responsive to the unique interface signals for changing the state of the stored current condition signals associated with input devices to conform to the current condition of input devices;
   (c) means responsive to the stored current condition signals for changing the state of the unique interface signals associated with output devices; and
   (d) means responsive to the processing means for changing the state of stored current condition signals associated with output devices.

3. The apparatus of claim 2 wherein at least one mechanism cycle of operation includes at least one conditional instruction requiring the expiration of a predetermined interval and the processing means further comprises:
   (a) timing means for marking the expiration of the predetermined interval;
   (b) means for selecting the next instruction to be executed of an executable mechanism cycle; and
   (c) means responsive to the timing means and the selecting means for setting the status signal to a state representing an unexecutable condition when the selected instruction is a conditional instruction for which the predetermined interval has not expired and for resetting the status signal when the interval has expired.

4. The apparatus of claim 1 further comprising means for modifying the status signal of a selected mechanism cycle of operation.

5. The apparatus of claim 4 further comprising a name table store for storing variable name signals representing input and output devices and variable values.

6. The apparatus of claim 5 wherein the instruction signals further comprise variable name index signals representing locations of variable name signals within the name table.

7. The apparatus of claim 6 wherein the variable name signals occupy unchanging locations within the name table and the name table store further comprises means for storing name table link signals representing relative locations of name signals within the name table.

8. The apparatus of claim 7 further comprising:
   (a) means for detecting the presence of a selected variable name signal in the name table store;
   (b) means for deleting a selected stored variable name signal from the name table; and
   (c) means for entering a new variable name signal in the name table.

9. The apparatus of claim 8 wherein the variable name signals and link signals define a binary tree data structure and the apparatus further comprises:
   (a) means responsive to the delete means and the link signals for restoring the balance of the data structure following the deletion of a variable name signal; and
   (b) means responsive to the entering means and the link signals for restoring the balance of the data structure following the addition of a new variable name signal.

10. Apparatus for controlling the operation of a machine in response to a program of operation including a sequence of instructions defining a mechanism cycle of operation, the instructions relating sensed conditions of input devices, selectable conditions of output devices and variable values, and the input and output device conditions being represented by unique interface signals representing conditions of unique interface circuits associated with the input and output devices, the apparatus comprising:
   (a) means for storing the sequence of instruction signals representing the instructions of a mechanism cycle of operation, the instruction signals including variable name identifier signals representing memory locations of variable name signals associated with unique interface circuits;
   (b) means for storing a cycle status signal representing the executability of the sequence of instructions;
   (c) processing means responsive to the instruction signals and the status signals for executing the instructions so long as the status signal represents an executable condition;
   (d) means responsive to the unique interface signals, variable name signals and the processing means for altering the condition of a selected unique interface signal associated with an output device, thereby controlling the output device;

(e) communication means for exchanging message signals with a data communication device; and (f) means responsive to the message signals for selectively reassigning a unique interface circuit to a variable name signal irrespective of the condition of the status signal, the reassignment being effected concurrently with execution of instructions of the mechanism cycle.

11. The apparatus of claim 10 further comprising means for modifying the status signal of the mechanism cycle to reflect a nonexecutable condition.

12. The apparatus of claim 11 further comprising means responsive to the status signals and the message signals for selectively adding, deleting, and modifying selected instruction signals of the mechanism cycle when the status signal represents a nonexecutable condition.

13. The apparatus of claim 10 wherein the mechanism cycle of operation includes at least one conditional instruction requiring the satisfaction of a predefined condition and the processing means further comprises:

(a) means for selecting the next instruction to be executed; and (b) means responsive to the selecting means for setting the status signal to a state representing an unexecutable condition when the selected instruction is the conditional instruction and the predefined condition is not satisfied and for resetting the status signal when the predefined condition is satisfied.

14. The apparatus of claim 10 further comprising a name table store for storing variable name signals representing input and output devices and variable values.

15. The apparatus of claim 14 wherein the variable name identifier signals represent locations of variable name signals within the name table.

16. The apparatus of claim 15 further comprising:

(a) means for simultaneously storing current conditions signals representing the current state of all unique interface signals;

(b) means responsive to the unique interface signals for changing the state of the stored current condition signals associated with input devices to conform to the current condition of input devices;

(c) means responsive to the stored current condition signals for changing the state of the unique interface signals associated with output devices; and (d) means responsive to the processing means for changing the state of stored current condition signals associated with output devices.

17. The apparatus of claim 16 wherein the name table store further comprises means for storing current condition store address signals representing the location of current condition signals within the storing means therefore.

18. The apparatus of claim 17 wherein the means for selectively reassigning the unique interface circuit further comprises means for modifying the current condition store address signal within the name table.

19. A method for controlling the operation of a system defined by a plurality of mechanism cycles of operation, each cycle being defined by a plurality of instruction sequences relating sensed conditions of input devices, selectable conditions of output devices, and variable values, the input and output device conditions being represented by unique interface signals, and the method comprising the steps of:

(a) storing a plurality of instruction signals representing the mechanism cycles of operation;

(b) storing a plurality of mechanism cycle status signals, each status signal representing the executability of the sequence of instruction signals associated with a mechanism cycle of operation;

(c) executing instruction signals to produce new values for unique interface signals associated with output devices when the status signal indicates that the instruction sequence is in an executable condition; and (d) selectively adding, deleting, and modifying an instruction sequence for which the status signal represents a nonexecutable condition, of the instruction sequence the adding, deleting, and modifying of the nonexecutable instruction sequence being effected concurrently with execution instructions of executable sequences.

* * * * *